(12) United States Patent
Rahnamaee et al.

(10) Patent No.: US 9,755,538 B2
(45) Date of Patent: Sep. 5, 2017

(54) ACTIVE AC-LINK POWER CONVERTER

(71) Applicant: ABB Technology AG, Zurich (CH)

(72) Inventors: Arash Rahnamaee, Chicago, IL (US);
Hongrae Kim, Cary, NC (US); Zhiguo Pan, Cary, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/939,792

(22) Filed: Nov. 12, 2015

(65) Prior Publication Data

US 2017/0141693 A1    May 18, 2017

(51) Int. Cl.
*H02M 5/458*    (2006.01)

(52) U.S. Cl.
CPC .................... *H02M 5/458* (2013.01)

(58) Field of Classification Search
CPC ..................................................... H02M 5/458
See application file for complete search history.

(56) References Cited

U.S. PATENT DOCUMENTS

| | | | |
|---|---|---|---|
| 4,897,775 A * | 1/1990 | Klaassens | H02M 7/758 363/137 |
| 5,010,471 A | 4/1991 | Klaassens et al. | |
| 6,023,417 A | 2/2000 | Hava et al. | |
| 6,108,223 A | 8/2000 | Julian et al. | |
| 6,118,678 A * | 9/2000 | Limpaecher | H02M 5/4505 307/109 |
| 6,259,235 B1 * | 7/2001 | Fraidlin | H02M 3/158 323/222 |
| 6,804,127 B2 | 10/2004 | Zhou | |
| 7,057,905 B2 | 6/2006 | Macmillan | |
| 7,768,800 B2 | 8/2010 | Mazumder et al. | |
| 7,872,456 B2 | 1/2011 | Li et al. | |
| 8,503,207 B2 | 8/2013 | Tallam et al. | |
| 2005/0099829 A1 | 5/2005 | Wei et al. | |
| 2008/0013351 A1 | 1/2008 | Alexander | |
| 2012/0033464 A1 | 2/2012 | Alexander | |

(Continued)

OTHER PUBLICATIONS

Kim, In-Dong et al., "New Bilateral Zero Voltage Switching AC/AC Converter Using High Frequency Partial Resonant Link", Industrial Electronics Society, 16th Annual Conference of IEEE, 1990, pp. 857-862.

(Continued)

*Primary Examiner* — Emily P Pham
(74) *Attorney, Agent, or Firm* — Taft Stettinius & Hollister LLP

(57) ABSTRACT

A power converter includes an output converter having a 3-phase or higher output, an inductor coupled to the output converter and a switch device coupled to the inductor. The switch device charges the inductor via a DC input during a first stage of a switching cycle of the switch device. The output converter discharges the inductor to a load coupled to the 3-phase or higher output during a second stage of the switching cycle. The output converter includes a phase leg for each phase of the 3-phase or higher output, each phase leg having a first thyristor device connected in series with a second thyristor device. Each phase of the 3-phase or higher output originates between the first thyristor device and the second thyristor device of the corresponding phase leg.

20 Claims, 30 Drawing Sheets

(56) References Cited

U.S. PATENT DOCUMENTS

2012/0307531 A1    12/2012   Toliyat et al.
2014/0286059 A1     9/2014   Tollyat et al.

OTHER PUBLICATIONS

Lei, Qin et al., "PWAM Boost-Converter-Inverter System for EV Engine Starter/Alternator", IEEE, Energy Conversion Congress and Exposition (ECCE), 2012, pp. 2969-2976.

Rahnamaee, Arash et al., "A Soft-Switched Hybrid-Modulation Scheme for a Capacitor-Less Three-Phase Pulsating-DC-Link Inverter", IEEE Transactions on Power Electronics, vol. 29, No. 8, Aug. 2014, pp. 3893-3906.

Sood, Pradeep K. et al., "Power Conversion Distribution System Using a High-Frequency AC Link", IEEE Transactions on Industry Applications, vol. 24, No. 2, Mar./Apr. 1988, pp. 288-300.

Ngo, Khai Doan, "The Topology and Analysis i PWM Inversion, Rectification, and Cycloconversion", 1984 Dissertation (Ph.D.), California Institute of Technology, pp. 277-286.

US/RO International Search Report and Written Opinion, PCT/US16/61780, ABB Schweiz AG, Jan. 19, 2017, 10 pgs.

\* cited by examiner

ACTIVE AC-LINK POWER CONVERTER

TECHNICAL FIELD

The instant application relates to power converters, and more particularly to active AC link power converters.

BACKGROUND

Conventional power converters are realized using IGBTs (insulated gate bipolar transistors) since they require forced commutation for the output converter. The gate of an IGBT can be controlled so as to switch the IGBT on or off irrespective of output current level, and therefore IGBTs are typically used in the output converter of conventional power converters to achieve the necessary forced commutation. However, power losses in conventional output converters are relatively high e.g. significantly higher than 1% of the load power.

SUMMARY

According to an embodiment of a power converter, the converter comprises an output converter having a 3-phase or higher output, an inductor coupled to the output converter and a switch device coupled to the inductor. The switch device is configured to charge the inductor via a DC input during a first stage of a switching cycle of the switch device. The output converter is configured to discharge the inductor to a load coupled to the 3-phase or higher output during a second stage of the switching cycle. The output converter comprises a phase leg for each phase of the 3-phase or higher output, each phase leg comprising a first thyristor device connected in series with a second thyristor device. Each phase of the 3-phase or higher output originates between the first thyristor device and the second thyristor device of the corresponding phase leg.

According to an embodiment of a method of converting DC power to AC power using a power converter that includes an output converter having a 3-phase or higher output, an inductor coupled to the output converter, and a switch device coupled to the inductor, the method comprises: controlling the switch device so as to charge the inductor via a DC input during a first stage of a switching cycle of the switch device; discharging the inductor to a load coupled to the 3-phase or higher output via the output converter during a second stage of the switching cycle, the output converter comprising a phase leg for each phase of the 3-phase or higher output, each phase leg comprising a first thyristor device connected in series with a second thyristor device, each phase of the 3-phase or higher output originating between the first thyristor device and the second thyristor device of the corresponding phase leg; and ensuring the inductor is fully discharged to the load before beginning another switching cycle.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide an active AC link power converter which transforms input DC power to output AC power. For PV (photovoltaic) or other battery power applications, the input of the active AC link power converter connects to the PV or battery directly. For motor drive applications, the input of the active AC link power converter connects to another front-end converter that converts AC to DC. The active AC link power converter can operate as an inverting buck-boost converter, non-inverting buck-boost converter, boost converter, etc. In each case, the DC input charges the inductor of the active AC link, and the output converter discharges the stored inductor energy to a load or grid.

The active AC link power converter operates in discontinuous conduction mode (DCM) in which the current of the inductor reaches zero in each switching cycle. As a result, the output converter can be realized using lower cost thyristors, which turn-off automatically when the inductor current reaches zero. The active AC link can include an active clamping circuit coupled in parallel with the inductor of the active AC link for freewheeling current in the charged inductor before any of the thyristor devices begin conducting. This way, the current in the inductor is provided a freewheeling path and voltage spikes of the active switch are limited prior to the thyristors being ready to discharge the inductor current to the load. In addition, the resonant operation of the power converter is practically load independent in that the period of resonance in the active AC link is nearly constant for all load conditions. Also, the circulating power in the active AC link is less than 1% of the load power and is load independent.

Due to DCM operation of the power converter, the current of the link inductor reaches zero in each switching cycle. One challenge for a typical AC-link inverter is its difficulty in regulating current on all three (or more) output phases. A modulation scheme described herein feeds two of the output lines (phases) in successive switching cycles to improve the quality of the output (voltage and current) waveforms of the inverter. In the case of a 3-phase output, only two thyristors of the output inverter commutate in each switching cycle to connect the power converter output to a load. The amount of energy stored in the AC link inductor is modulated based on the maximum value of current reference signals for the different phases. The average of the inductor current represents the maximum value of the reference signals. This reduces the switching requirement of the output inverter and improves the quality of the output waveforms since two of the output lines (phases) are feed in successive switching cycles.

Figure 1A:
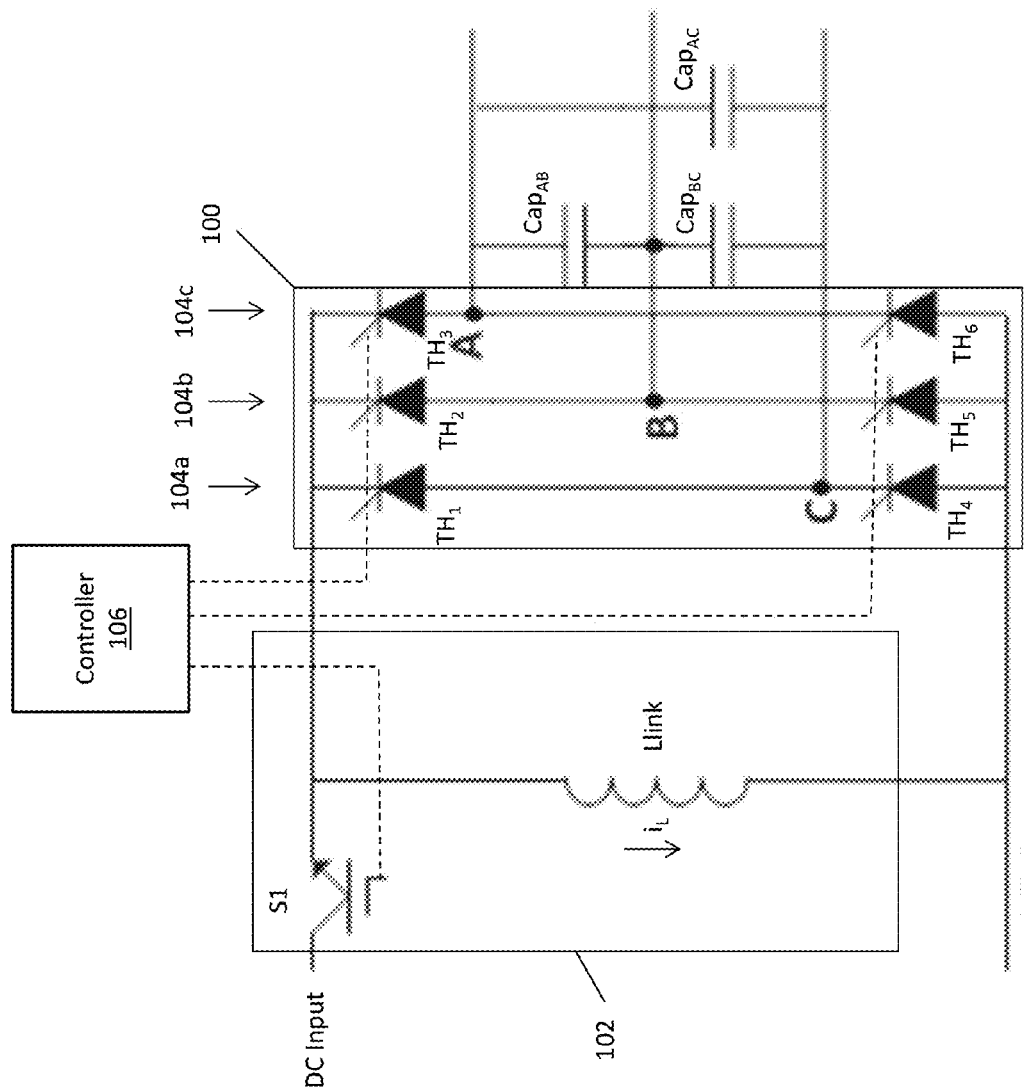
FIG. 1A illustrates a schematic diagram of an embodiment of an active AC link power converter having an inverting buck-boost stage as the AC link.

FIG. 1A illustrates an embodiment of an active AC power link converter which transforms input DC power to output AC power. According to this embodiment, the power converter is an inverting buck-boost power converter. The inverting buck-boost power converter comprises an output converter 100 having a 3-phase or higher output, and an active AC link 102 including an inductor Llink coupled to the output converter 100 and a main switch S1 coupled to the link inductor Llink. Any bidirectional, voltage-blocking unidirectional current switching device can be used as the main switch S1. The main switch S1 is configured to charge the inductor Llink via a DC input during a first stage of a switching cycle of the main switch S1. The output converter 100 is configured to discharge the inductor Llink to a load (not shown in FIG. 1A) coupled to the 3-phase or higher output during a second stage of the switching cycle.

The output converter 100 comprises a phase leg 104a, 104b, 104c for each phase of the 3-phase or higher output. FIG. 1A shows a 3-phase output (A, B, C), with each phase (line) of the power converter being coupled to the other phase (lines) by a respective capacitor component $Cap_{AB}$, $Cap_{BC}$, $Cap_{AC}$. Each phase leg 104a, 104b, 104c comprises a first thyristor device $TH_1/TH_2/TH_3$ connected in series with a second thyristor device $TH_4/TH_5/TH_6$. Each thyristor device is in a non-conducting state at the beginning of each switching cycle i.e. DCM in which the inductor current ($i_L$) reaches zero in each switching cycle. The thyristors turn-off automatically under this zero-current switching condition. Each phase of the 3-phase or higher output originates between the first thyristor device and the second thyristor device $TH_1/TH_4$, $TH_2/TH_5$, $TH_3/TH_6$ of the corresponding phase leg 104a, 104b, 104c. A controller 106 controls the closed/open state of the main switch S1 and triggering of the output converter thyristors.

Figure 1B:
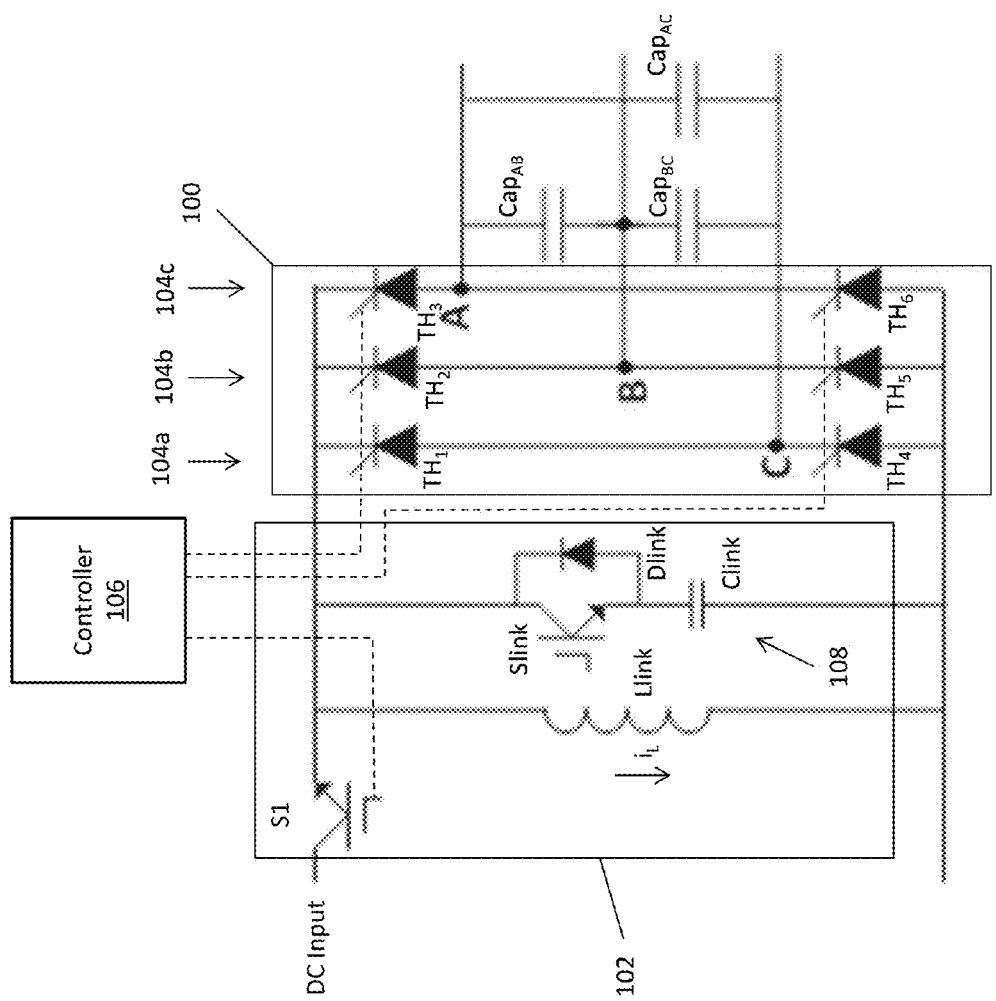
FIG. 1B illustrates a schematic diagram of an embodiment of the active AC link power converter of FIG. 1A, in which the AC link further includes an active clamping circuit coupled in parallel with the link inductor.

FIG. 1B shows another embodiment of the inverting buck-boost power converter of FIG. 1A, in which the active AC link 102 further includes an active clamping circuit 108 coupled in parallel with the link inductor Llink. The active clamping circuit 108 is configured to freewheel current in the link inductor Llink after the first stage of a switching cycle ends i.e. the main switch S1 is opened and the link inductor Llink is fully charged, and before any of the output converter thyristor devices begin conducting during the second stage of the switching cycle in which the inductor is discharged to the load. In one embodiment, the active clamping circuit 108 comprises an auxiliary capacitor Clink and an auxiliary switch Slink in series and a diode Dlink in antiparallel with the switch Slink.

Figure 2:
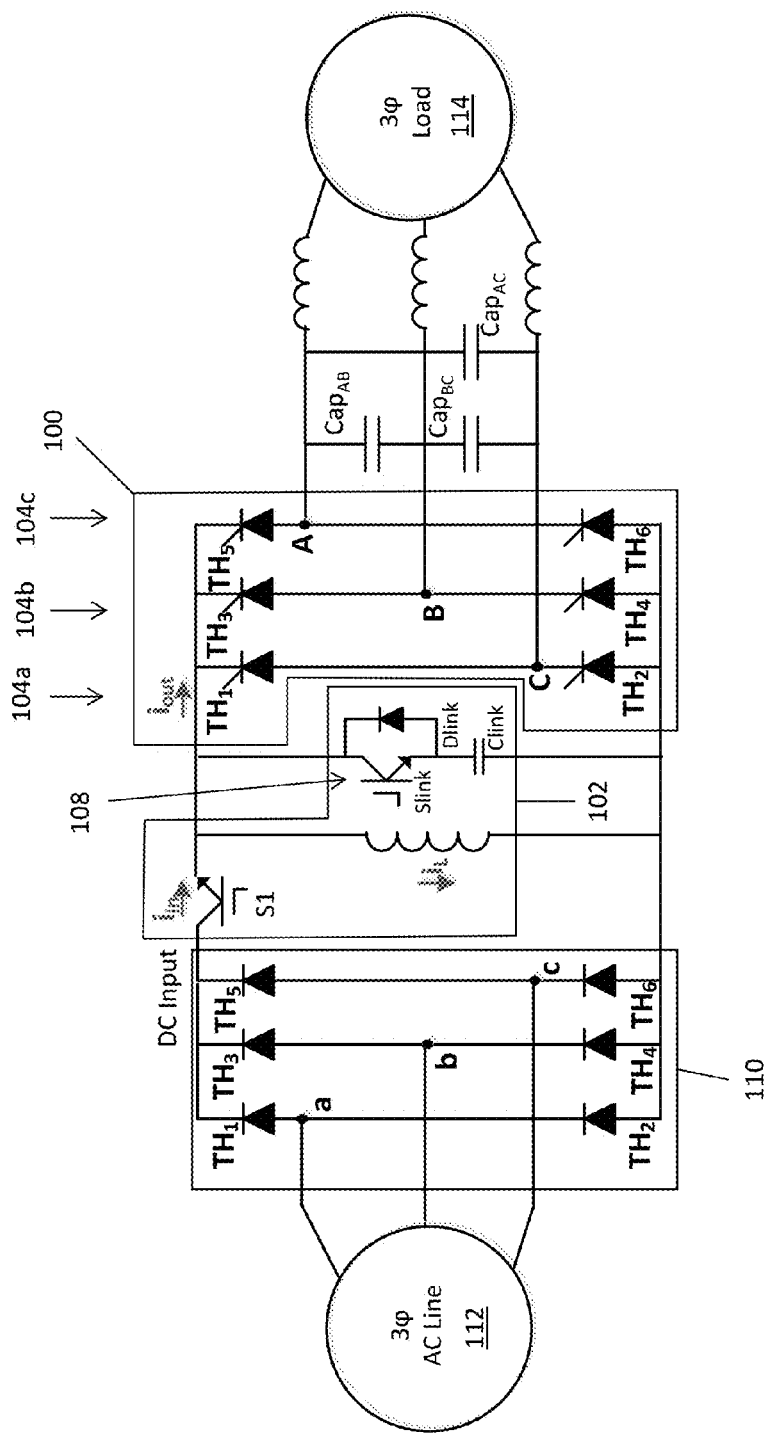
FIG. 2 illustrates a schematic diagram of an embodiment of the inverting buck-boost AC link power converter shown in FIG. 1B, in which the power converter operates as a 3-phase motor drive.

FIG. 2 illustrates an embodiment of the active AC link converter with the inverting buck-boost stage shown in FIG. 1B, in which the power converter operates as a 3-phase motor drive. The AC link converter is fed by a front-end converter 110 realized as a series combination of a three-phase diode rectifier which converts a 3-phase (a, b, c) AC line source 112 to the DC input provided to the main switch S1. This realization minimizes the number of switching devices of the power converter. The front-end converter 110 comprises three phase legs of thyristor pairs $TH_1/TH_4$, $TH_2/TH_5$, $TH_3/TH_6$ which operate under zero-current turn-on conditions. When the main switch S1 is on, the link inductor Llink is being charged through the front-end converter 110. When the main switch S1 turns off, the output converter 100 discharges the energy stored in the link inductor Llink to a 3-phase (A, B, C) load 114. In general, any bidirectional voltage-blocking, unidirectional current switching devices can be used as the switches of the front-end converter 110. The power converter controller 106 is not shown in FIG. 2 for ease of illustration, but controls the gate voltages of all the power converter switching devices.

Figure 3:
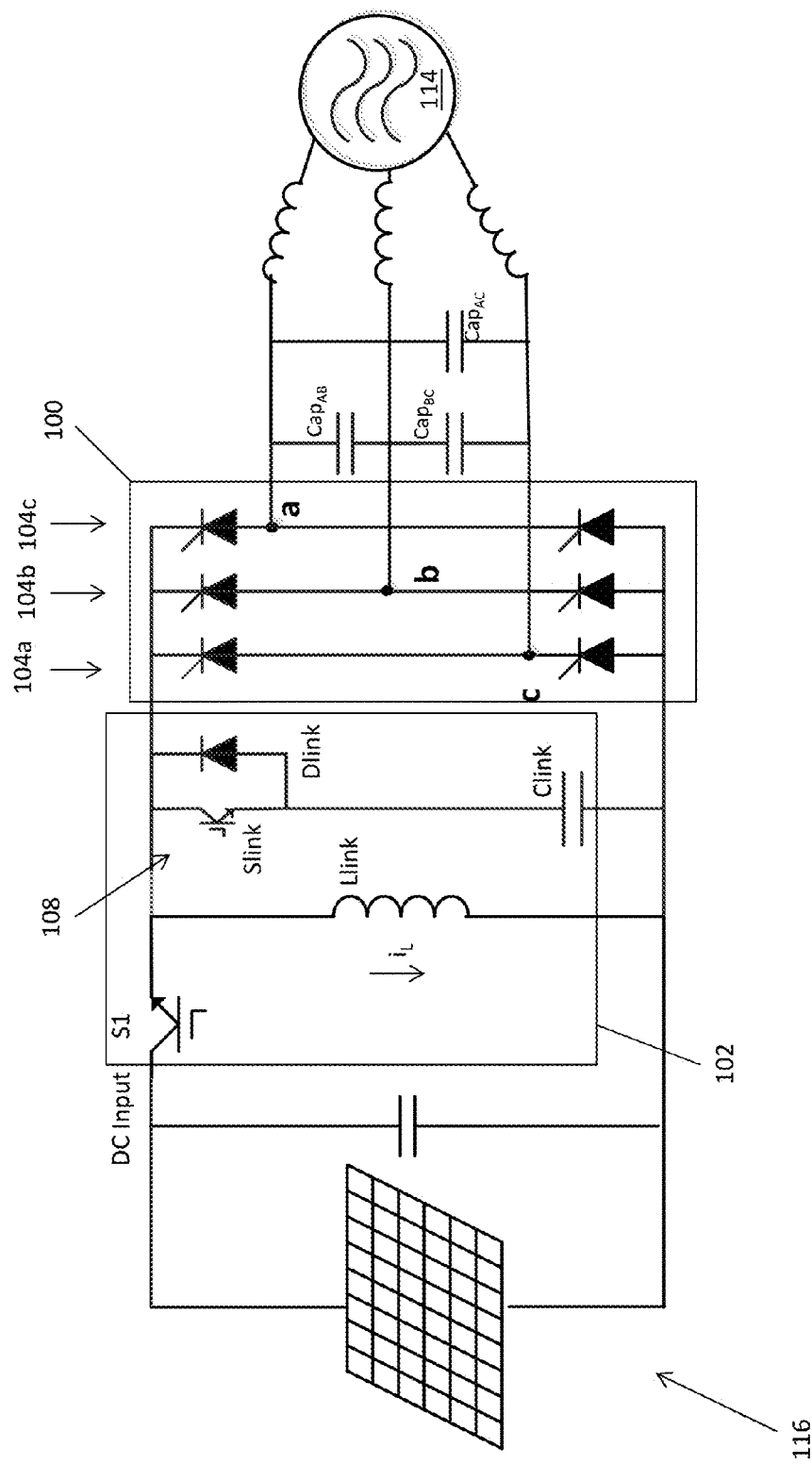
FIG. 3 illustrates a schematic diagram of an embodiment of the inverting buck-boost AC link power converter shown in FIG. 1B, in which the power converter operates as a photovoltaic converter.

FIG. 3 illustrates an embodiment of an AC link converter with the inverting buck-boost stage shown in FIG. 1B, in which the power converter operates as a PV (photovoltaic) converter. According to this embodiment, the DC input to the main switch S1 of the power converter is provided by a PV array 116 instead of a front end converter 110 as in FIG. 3. When the main switch S1 is on, the link inductor Llink is being charged by the PV array 116 without AC rectification. When the main switch S1 turns off, the output converter 100 discharges the energy stored in the link inductor Llink to the load 114. The power converter controller 106 is not shown in FIG. 3 for ease of illustration, but controls the gate voltages of all the power converter switching devices.

Figure 4:
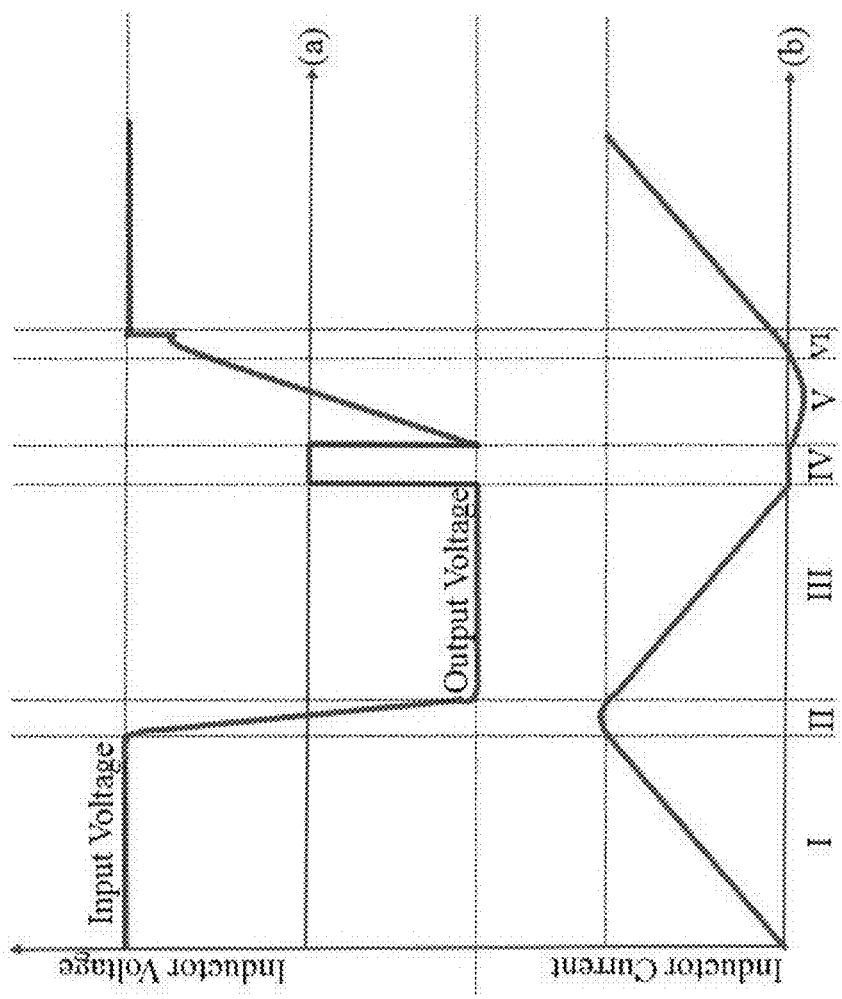
FIG. 4 illustrates the voltage and current waveforms of the AC link power converter of FIG. 2 during operation.

Operation of the inverting buck-boost power converter shown in FIG. 2 is described next in further detail in connection with FIG. 4 and FIGS. 5A through 5F. FIG. 4 shows the voltage and current waveforms of the inverting buck-boost power converter during operation, and FIGS. 5A through 5F show the different modes of operation for the power converter. In FIGS. 5A through 5F, the inductor voltage is labeled $V_L$, the inductor current is labeled $i_L$ and the current paths in the different modes are highlighted with arrows. The power converter controller 106 is not shown in FIGS. 5A through 5F for ease of illustration, but controls the gate voltages of all the power converter switching devices to enable the different modes of operation.

During Mode I (FIG. 5A), the main switch S1 is already turned on i.e. the main switch S1 is conducting. Therefore, the link inductor Llink is connected to the DC input supply. As a result, the link inductor Llink is being charged, and $i_L$ is linearly increasing. Mode I ends when the inductor current reaches its desired peak value.

Mode II (FIG. 5B) starts when the inductor current reaches its desirable peak value, and the main switch S1 turns off. The gate signals of one thyristor in two different phase legs are changed to high by the controller 106 to trigger these thyristors. However, these thyristors do not begin conducting immediately since the turn on of the thyristors is much slower than turn off of the main switch S1. As such, the active AC link 102 is disconnected from the DC input and from the multi-phase output of the power converter. Diode Dlink of the active clamping circuit 108 conducts in Mode II so as to freewheel (circulate) the inductor current, causing the link capacitor Clink to discharge from its positive value relative to the output voltage of the power converter. When the voltage across the link capacitor Clink reaches a negative value equal to the output voltage, the thyristors previously triggered by the controller 106 become forward biased and start conducting under the zero voltage turn-on condition.

Mode III (FIG. 5C) starts when the triggered output thyristors begin conducting and the link inductor Llink starts being discharged to the load 114. The inductor current decreases linearly during this mode. Mode III ends when the energy stored in the link inductor Llink during Mode I is completely discharged to the load 114, and the inductor current reaches zero.

Mode IV (FIG. 5D) or 'idle' mode starts when the inductor current reaches zero. The output filter capacitors $Cap_{AB}$, $Ca_{BC}$, $Cap_{AC}$ are supplying the load currents at this point, and the energy stored in the link inductor Llink is zero. As such, the switching devices of the power converter can turn on/off under the zero-current switching condition. Consequently, the thyristors and the link diode Dlink turn off under the zero current turn-off condition. The switches of the front-end converter 110 can also turn on under the zero-current turn-on condition.

Mode V (FIG. 5E) starts when the link switch Slink turns on to initiate a resonant period between the link inductor Llink and the link capacitor Clink. The initial voltage of the link capacitor Clink is negative relative to the output voltage of the power converter. As such, current resonates in the link inductor Llink in the negative (opposite) direction, and the voltage across the link capacitor Clink reaches its positive value at the end of the resonant half cycle. Mode V ends when the inductor current is again positive. The resonant duration depends only on the resonant frequency of the link capacitor Clink and the link inductor Llink, and therefore is independent from the load conditions. The current flowing in the link inductor Llink and the link switch Slink is small, and only depends on the energy stored in the link capacitor Clink in the beginning of Mode V. The energy stored in the link capacitor Clink is small since this resonant capacitor is small.

Mode VI (FIG. 5F) starts when the inductor current crosses zero, and becomes positive. The link diode Dlink conducts the inductor current in Mode VI. During this mode of operation, the main switch 51 can be turned on to initiate another switching cycle. The current flowing in the link inductor Llink and the link switch Slink is very small. As such, the main switch 51 and the link switch Slink can practically commutate under zero current switching condition.

The controller 106 of the inverting buck-boost power converter controls the main switch 51 and the thyristors of the output converter 100 during operation of the power converter by closing the main switch 51 during the first stage of the switching cycle, so as to connect the link inductor Llink to the DC input and charge the inductor (Mode I), opening the main switch 51 and triggering one thyristor device of two different phase legs during the second stage of the switching cycle, so as to discharge the link inductor Llink to the load 114 when the thyristors are conducting (Modes II and II), and waiting for the link inductor Llink to fully discharge and for each thyristor to turn off automatically before initiating another switching cycle (Modes IV through VI). The controller 106 applies an appropriate gate signal to the link switch Slink in Mode V so that the voltage of the link capacitor Clink is reversed back to a positive value relative to the output voltage of the power converter as previously described herein.

Figure 6A:
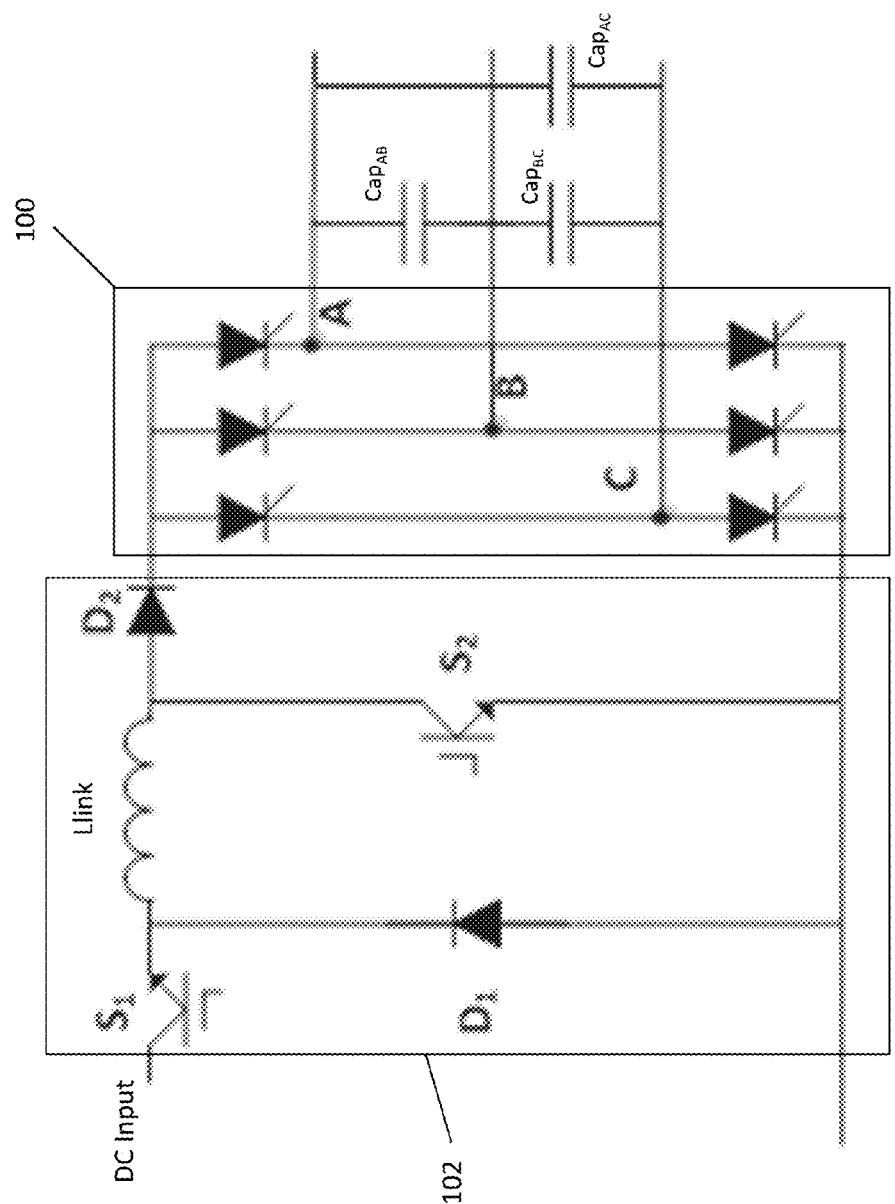
FIG. 6A illustrates a schematic diagram of an embodiment of an AC link power converter having a non-inverting buck-boost stage as the AC link.
Figure 6B:
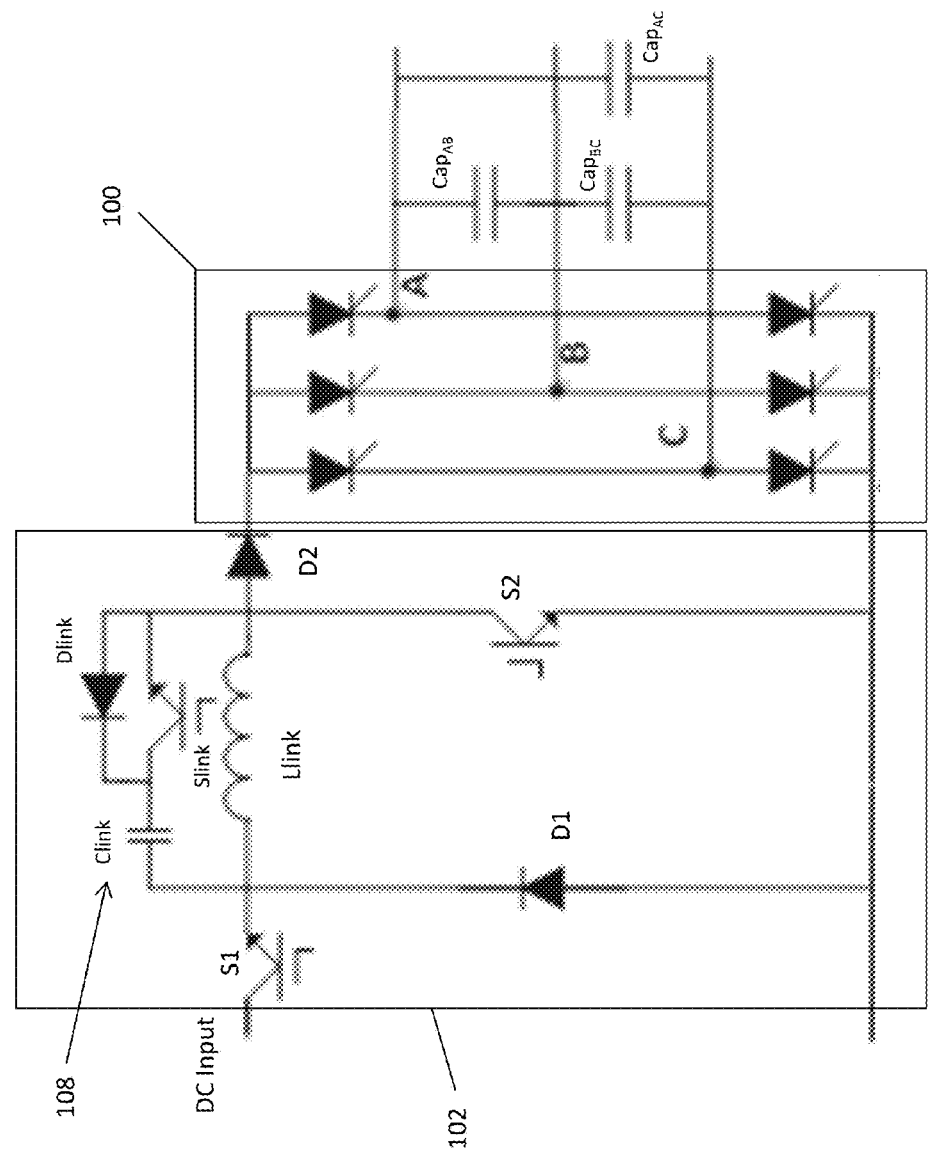
FIG. 6B illustrates a schematic diagram of an embodiment of the AC link power converter of FIG. 6A, in which the active AC link further includes an active clamping circuit coupled in parallel with the link inductor.

FIG. 6A illustrates another embodiment of the active AC link power converter, implemented with a non-inverting buck-boost stage. FIG. 6B shows the non-inverting buck-boost power converter of FIG. 6A, modified so that the active AC link 102 includes the active clamping circuit 108 coupled in parallel with the link inductor Llink as previously described herein. The voltage stress over the main switches S1, S2 of the non-inverting topology is lower as compared to the inverting topology. The non-inverting topology allows for a direct power flow path between the input and the output of the converter.

Figure 5A:
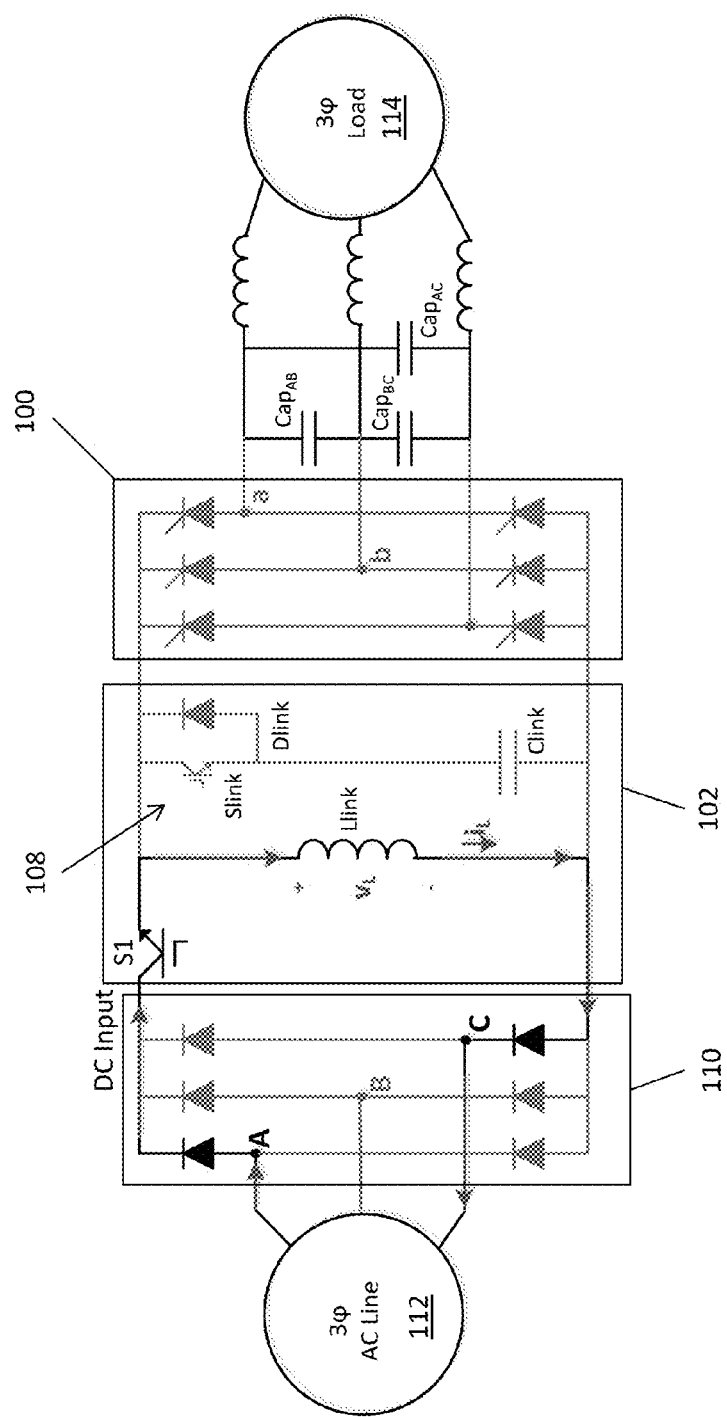
FIGS. 5A through 5F illustrate the different modes of operation for the power converter.
Figure 5B:
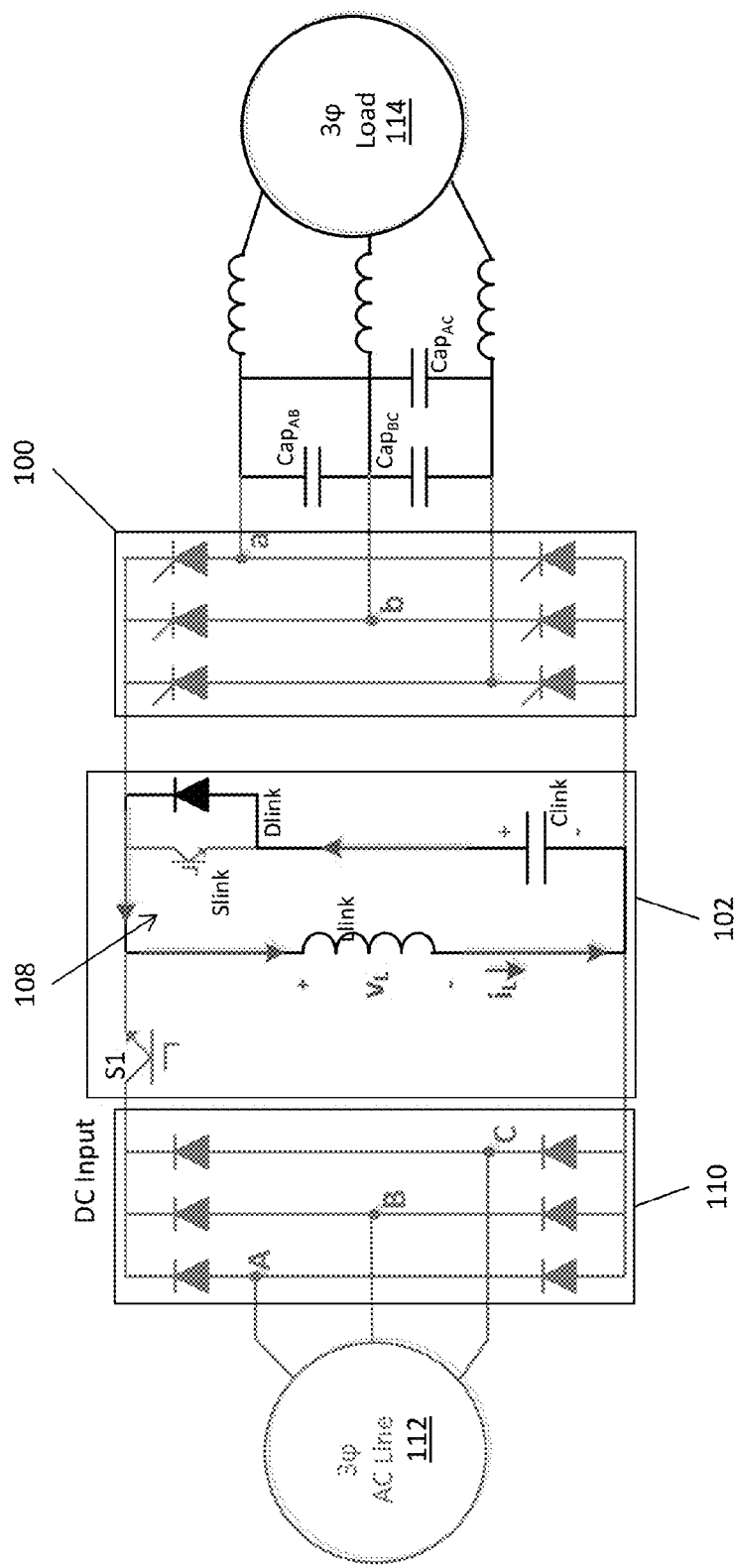
Figure 5C:
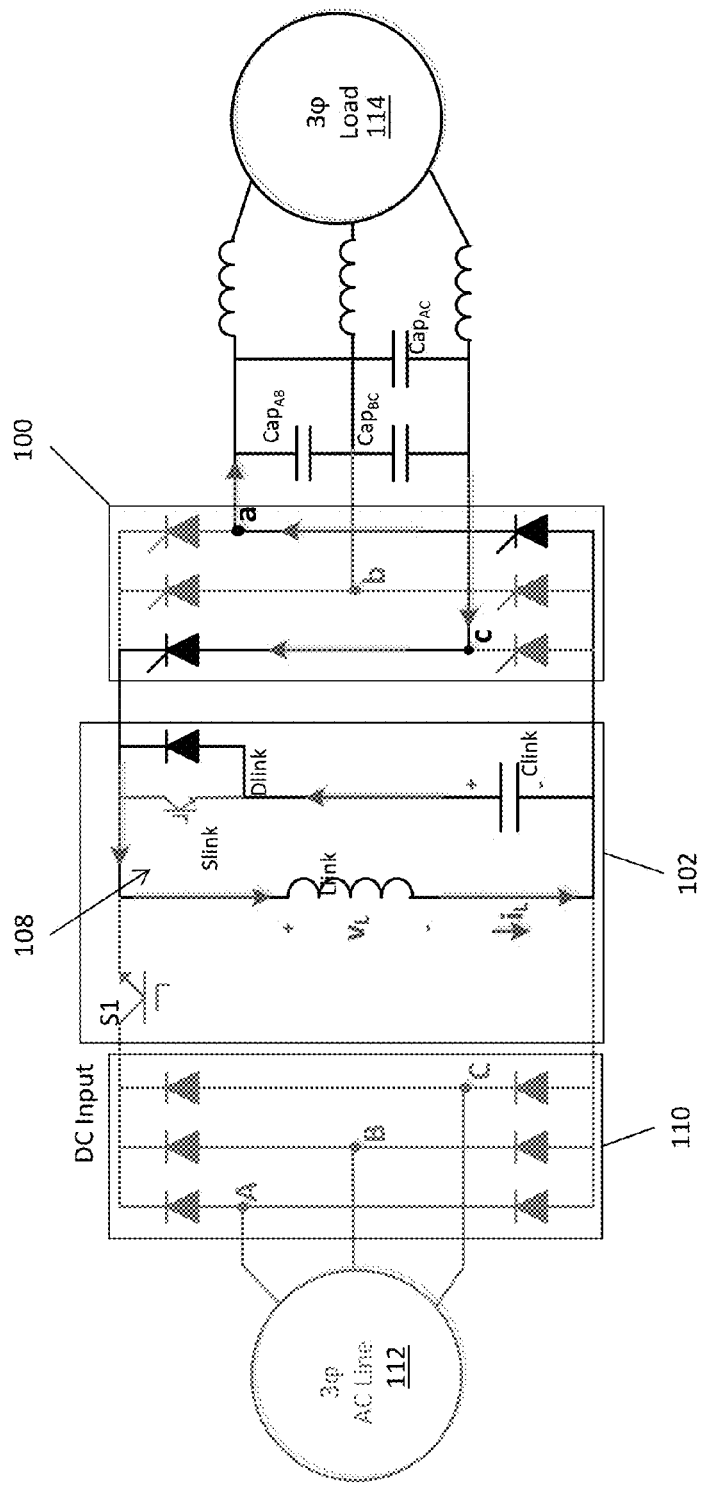
Figure 5D:
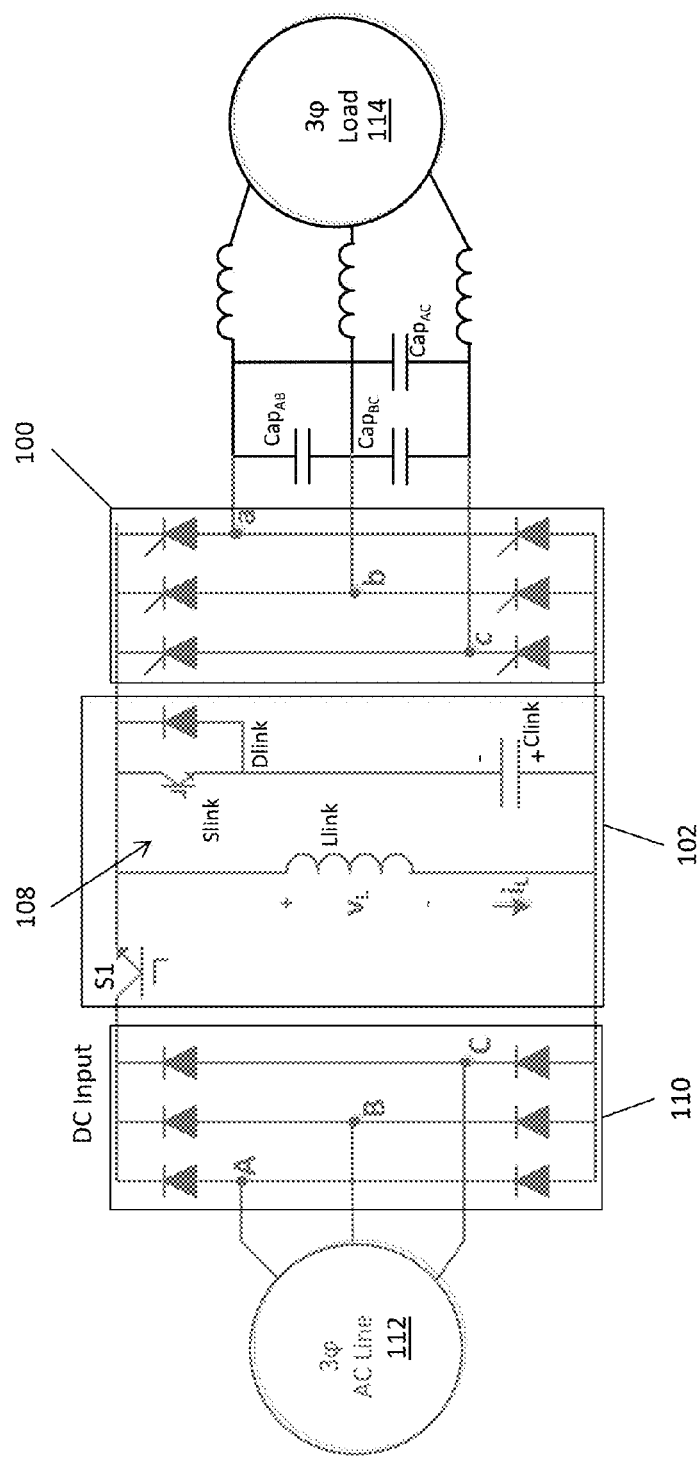
Figure 5E:
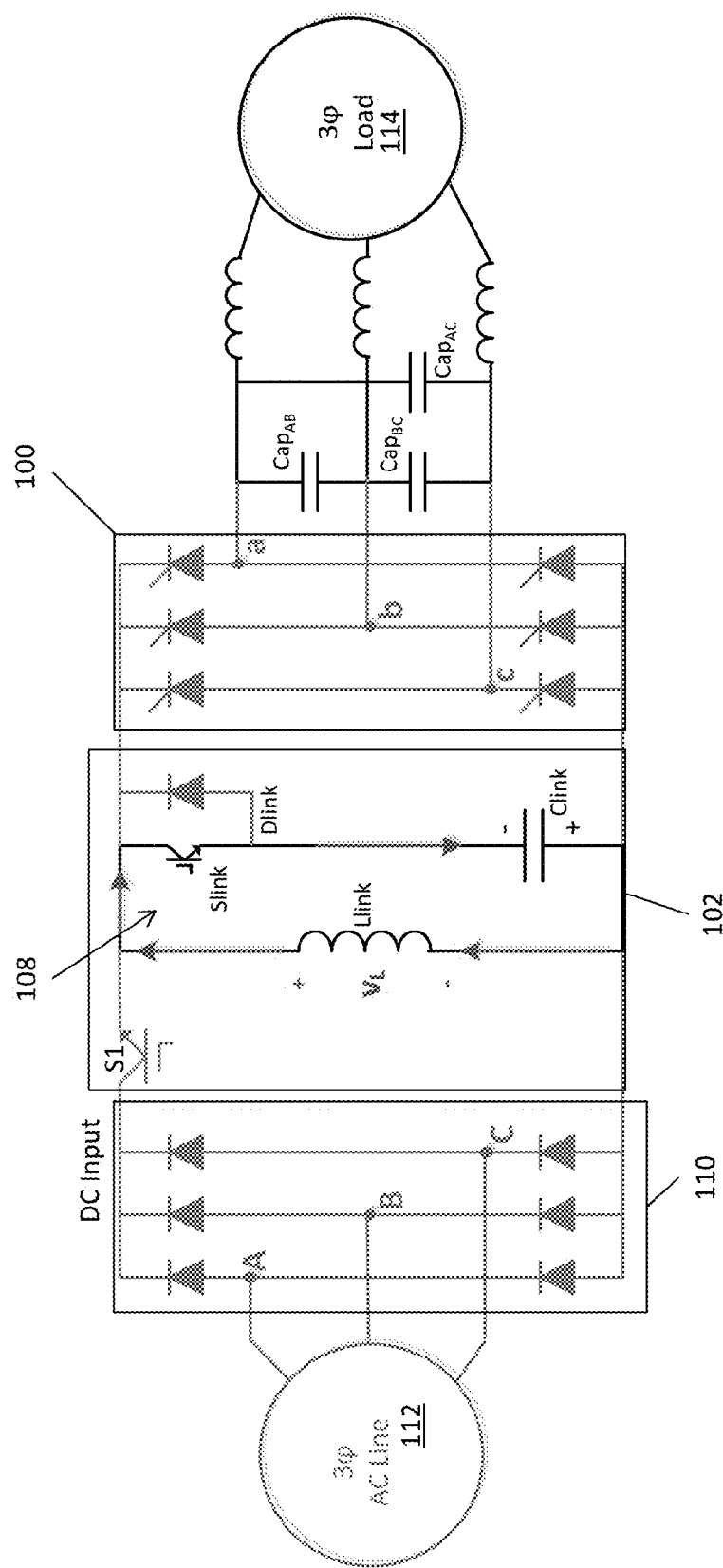
Figure 5F:
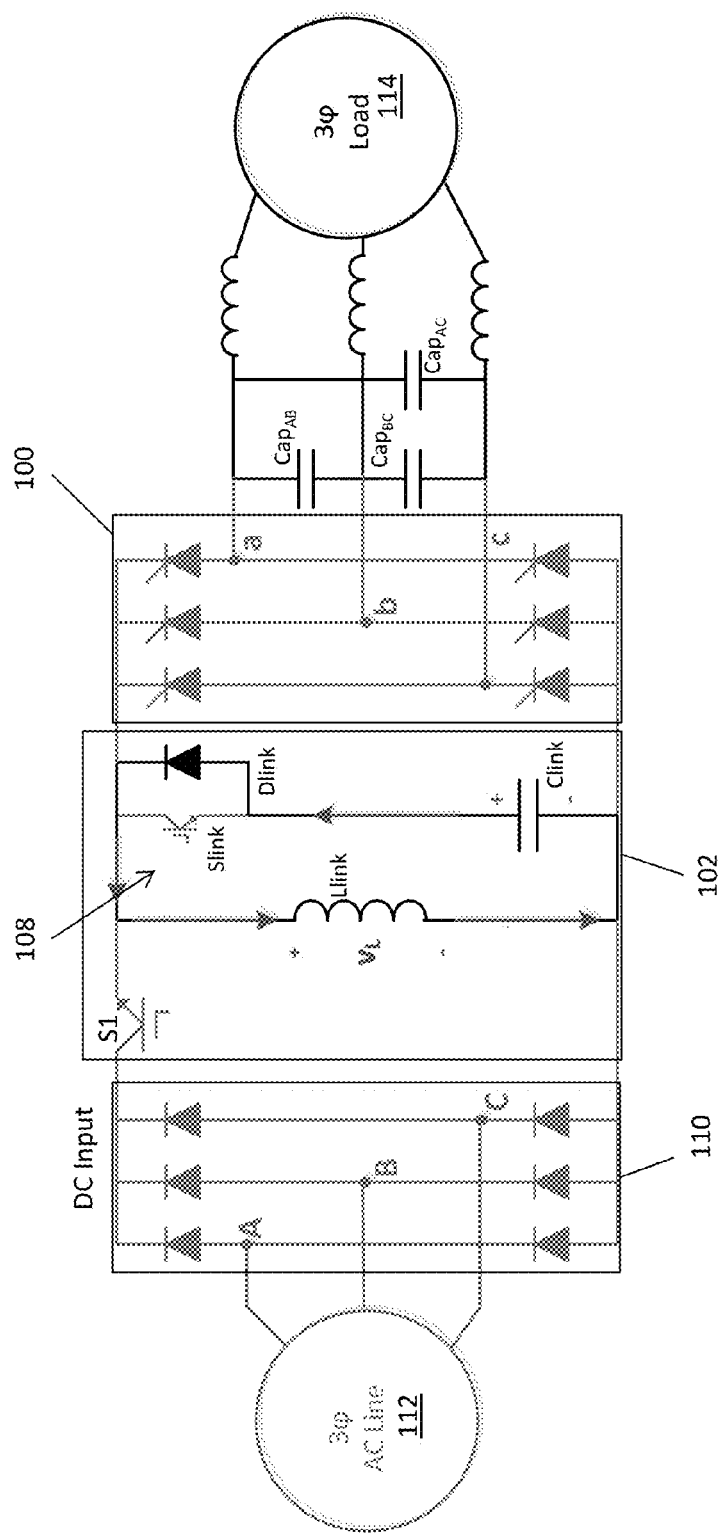
Figure 7:
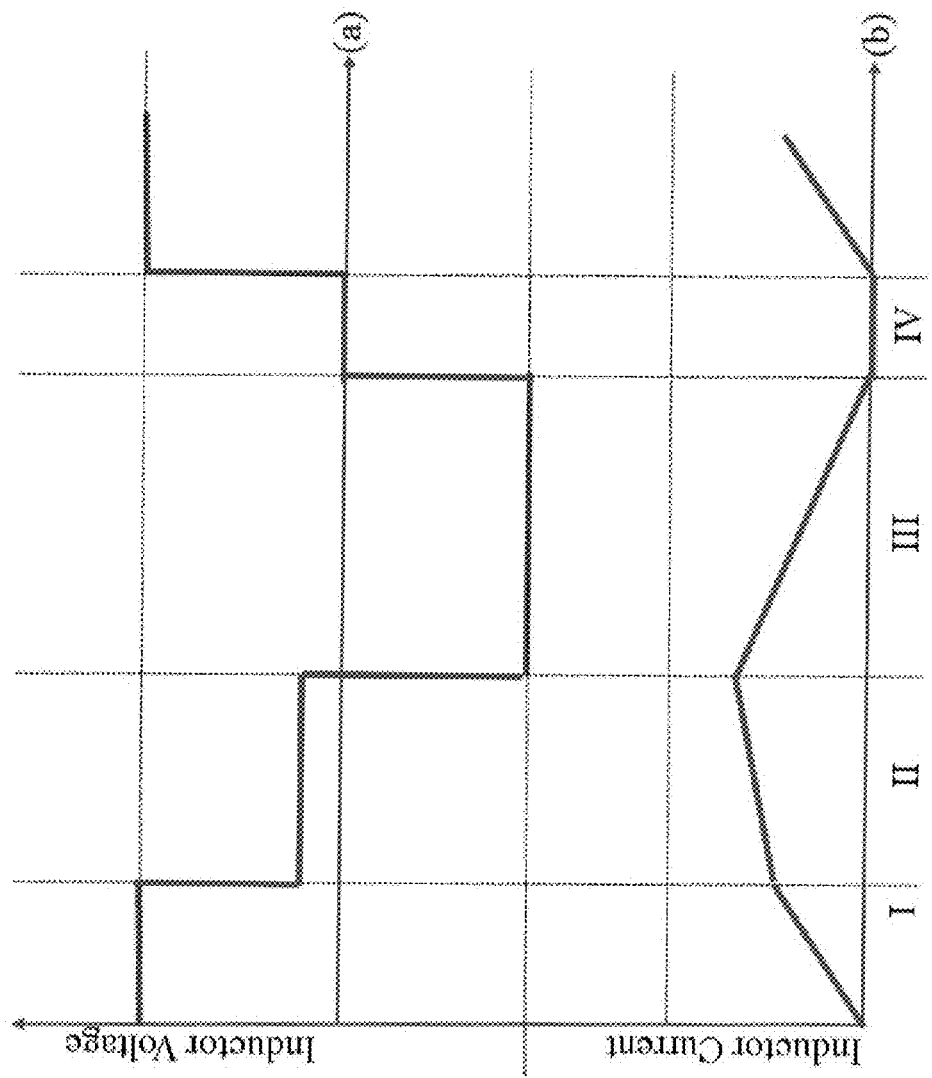
FIG. 7 illustrates the voltage and current waveforms of the AC link power converter of FIG. 6A during operation.
Figure 8A:
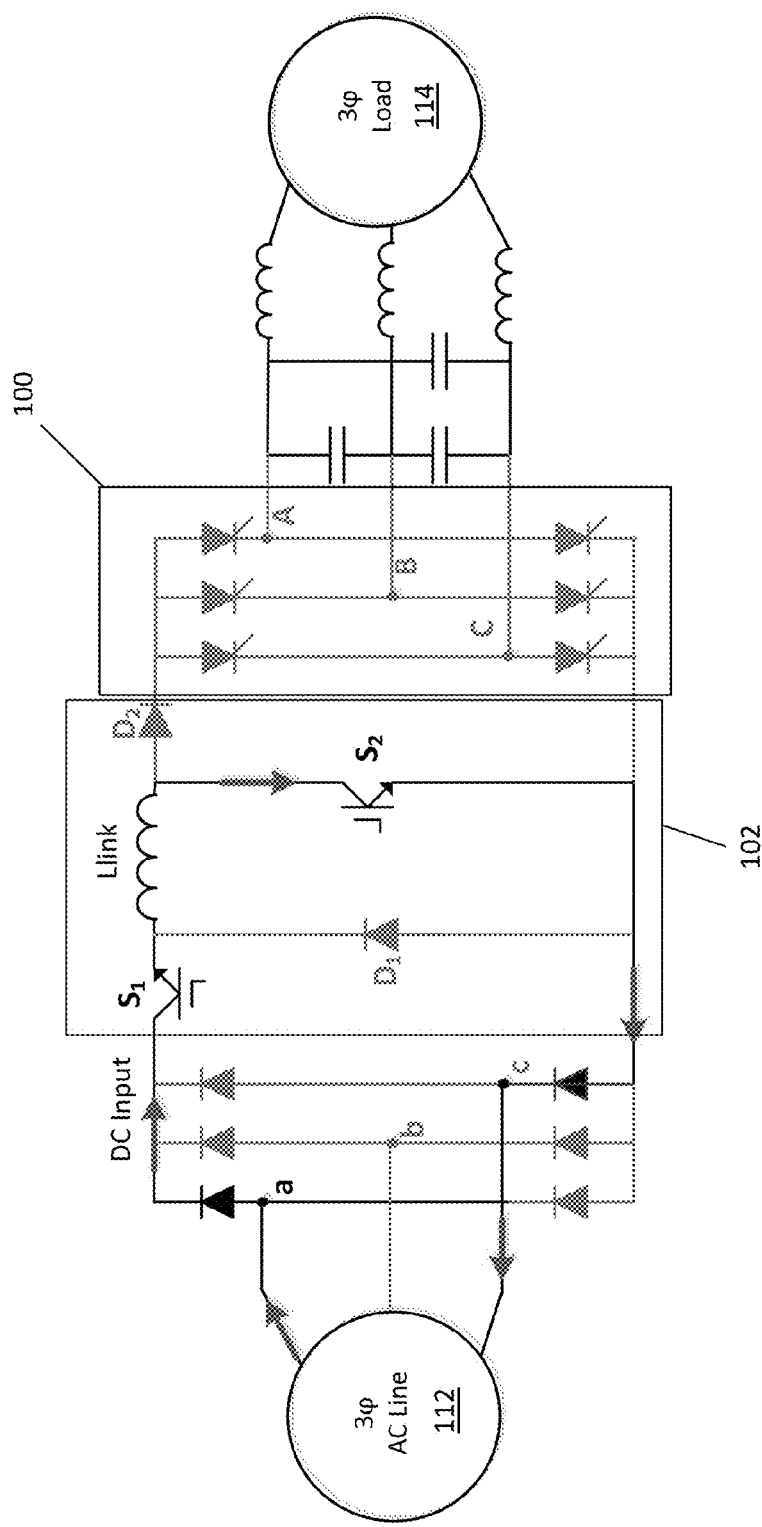
FIGS. 8A through 8D illustrate the different modes of operation for the power converter.
Figure 8B:
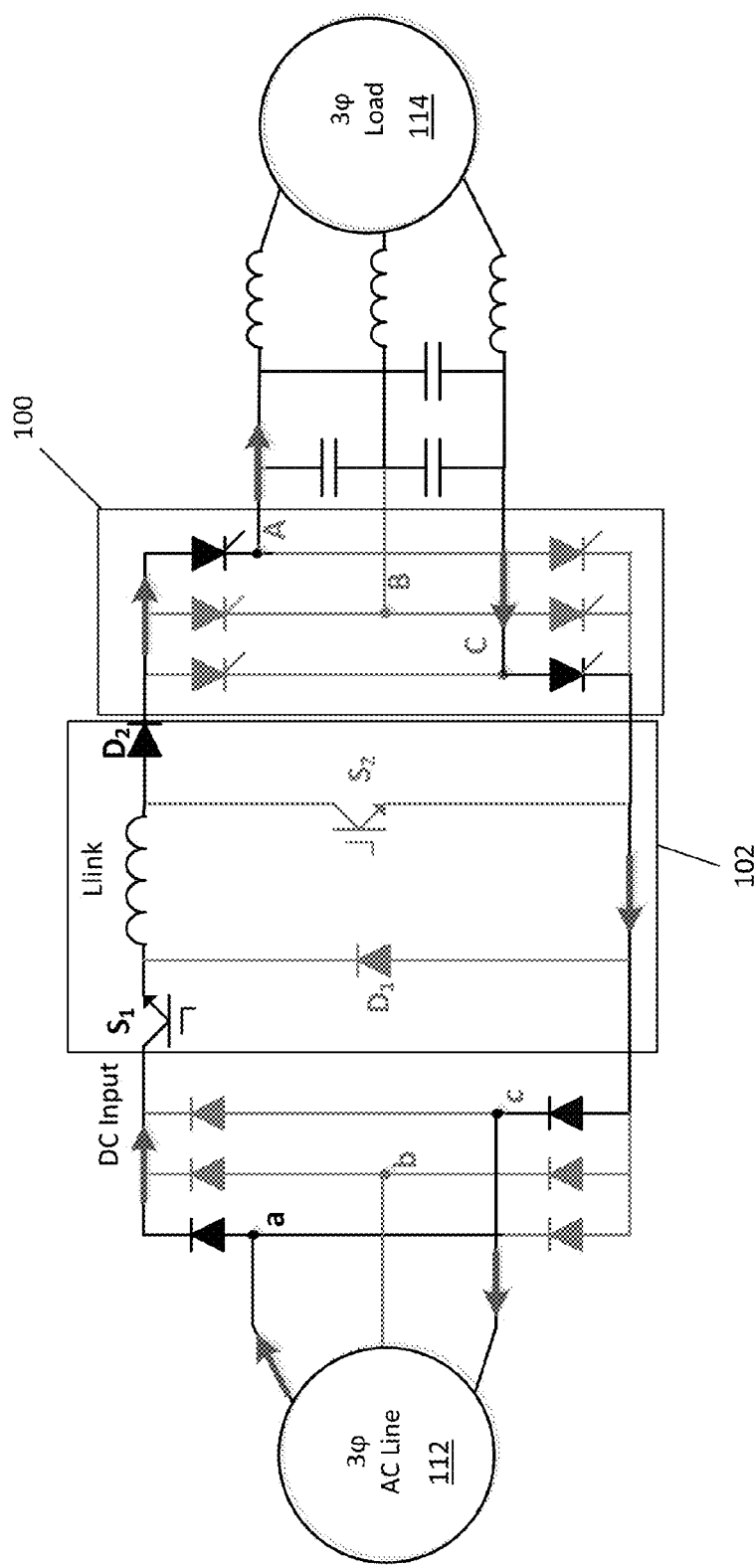
Figure 8C:
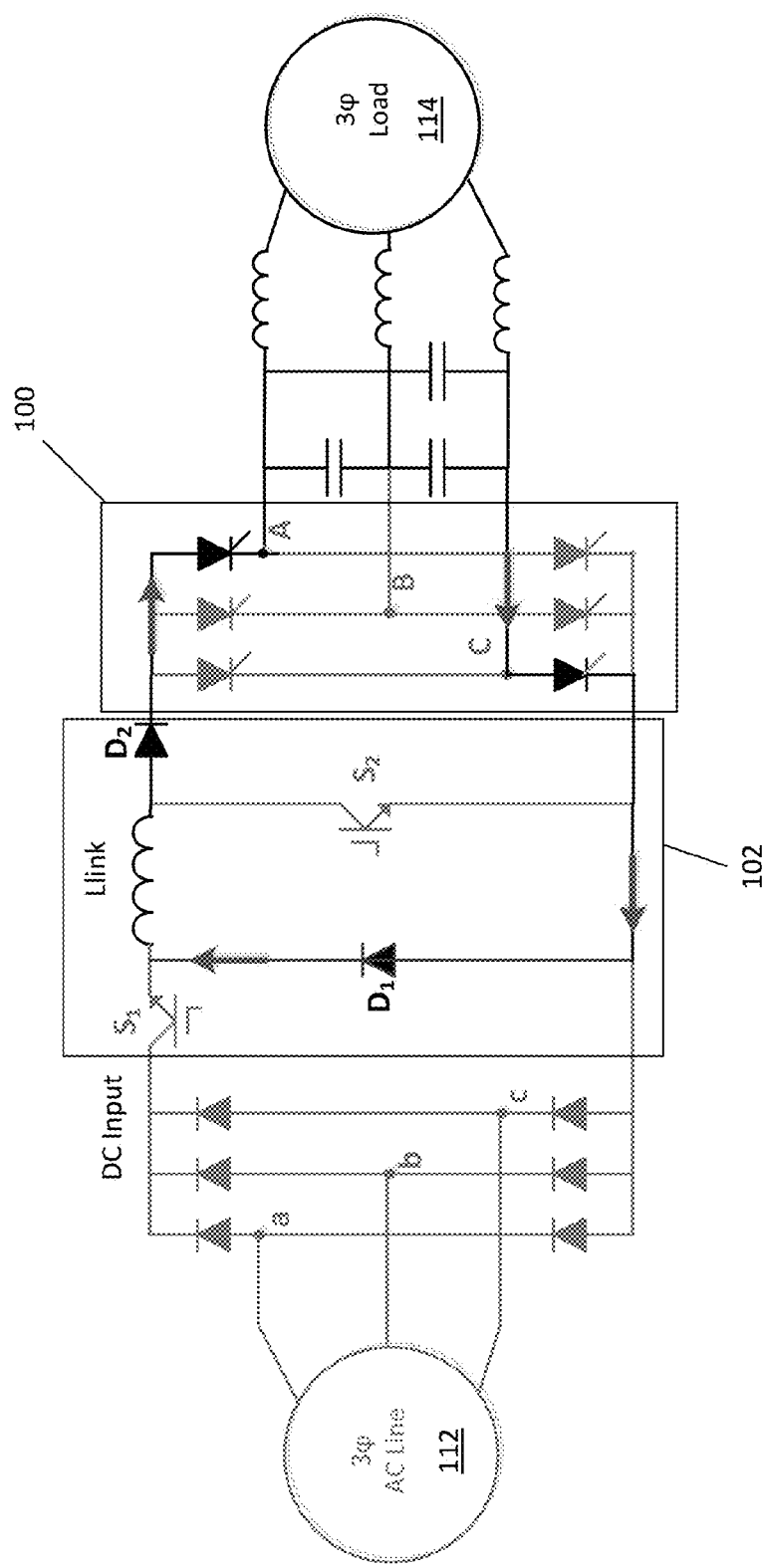
Figure 8D:
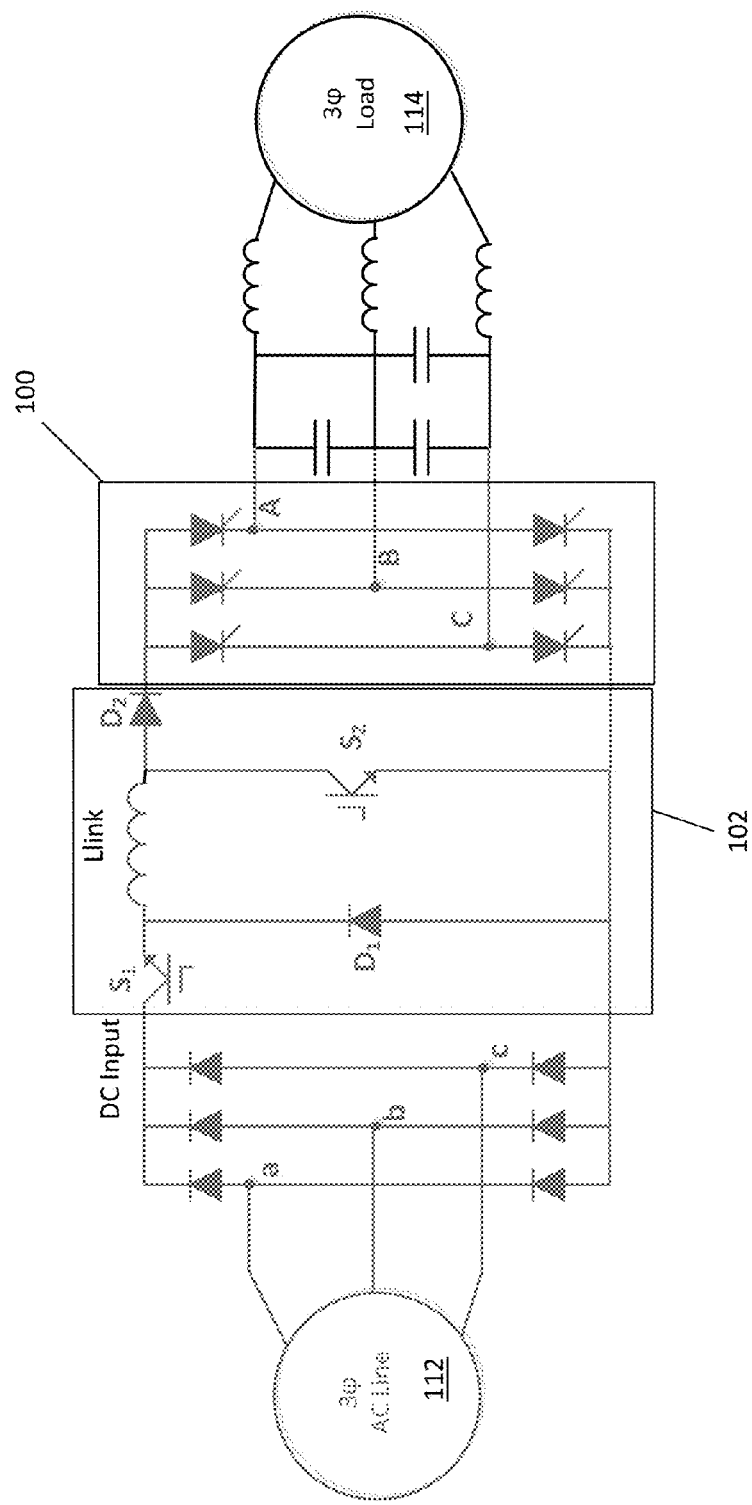

Operation of the non-inverting buck-boost power converter shown in FIG. 6A is described next in further detail in connection with FIG. 7 and FIGS. 8A through 8D. FIG. 7 shows the voltage and current waveforms of the non-inverting buck-boost power converter during operation, and FIGS. 8A through 8D show the different modes of operation for the power converter in which the power converter operates as a 3-phase motor drive as an illustrative example. In FIGS. 8A through 8D, the current paths in the different modes are highlighted with arrows. The modes of operation associated with the active clamping circuit 108 i.e. Modes V and VI previously described in connection with FIGS. 5E and 5F are identical for the non-inverting buck-boost power converter shown in FIG. 6B with the active clamping circuit 108, and therefore are not repeated here. The power converter controller 106 is not shown in FIGS. 8A through 8D for ease of illustration, but controls the gate voltages of all the power converter switching devices to enable the different modes of operation.

Mode I (FIG. 8A) starts when both main switches 51, S2 of the non-inverting buck-boost converter turn on in the beginning of a new switching cycle, directly connecting the link inductor Llink to the DC input. As a result, the link inductor Llink is being charged and $i_L$ is linearly increasing. Mode I ends when main switch S2 turns off.

In Mode II (FIG. 8B), a direct power path is provided between the input and output of the converter. Main switch S2 is already turned off, and therefore diode D2 turns on to carry on the inductor current. As a result, power directly transfers to the output during this mode of operation. The voltage applied to the link inductor Llink is equal to the difference between the input voltage and the output voltage. If the input voltage is higher than output voltage, the voltage applied to the link inductor Llink is positive and the current of the link inductor Llink is linearly increasing. If the input voltage is lower than the output voltage, the voltage applied to the link inductor Llink is negative and the inductor current is linearly decreasing. In the 3-phase motor drive example shown in FIGS. 8A through 8D, the voltage applied to the link inductor Llink is assumed positive. As such, the current of the link inductor Llink is increasing. Mode II ends when main switch S1 turns off.

Mode III (FIG. 8C) starts when main switch S1 is turned off at the end of Mode II and diode D1 turns on to carry the current of the link inductor Llink. As such, the link inductor Llink is being discharged to the load 114. The inductor current decreases until all energy stored in the link inductor Llink discharges to the load 114. At the end of Mode III, all switching components of the output converter 100 turn off under the zero-current switching conditions as previously described herein.

Mode IV (FIG. 8D) is an idle mode which starts when the inductor current reaches zero, and therefore all switching components of the power converter are off during this mode. The output capacitors $Cap_{AB}$, $Cap_{BC}$, $Cap_{AC}$ are solely supplying the load 114 at this point. At the end of Mode IV, main switches S1 and S2 can be turned on to initiate another switching cycle.

The controller 106 of the non-inverting buck-boost power converter controls main switches S1, S2 and the thyristors of the output converter 100 during operation of the power converter by closing main switches S1, S2 during the first stage of the switching cycle, so as to connect the inductor Llink to the DC input and charge the inductor (Mode I), closes main switch S2 and triggers one thyristor device of two different phase legs during a first part of the second stage of the switching cycle in which main switch S1 remains closed, so as to transfer power directly from the DC input to the load 114 via the link inductor Llink and main switch S1 when the triggered thyristors begin conducting (Mode II), opens main switch S1 during a second part the second stage of the switching cycle after the first part, so as to discharge the link inductor Llink to the load 114 (Mode III), and waits for the link inductor Llink to fully discharge and for each thyristor of the output converter 100 to turn off automatically before initiating another switching cycle (Mode IV).

Figure 9A:
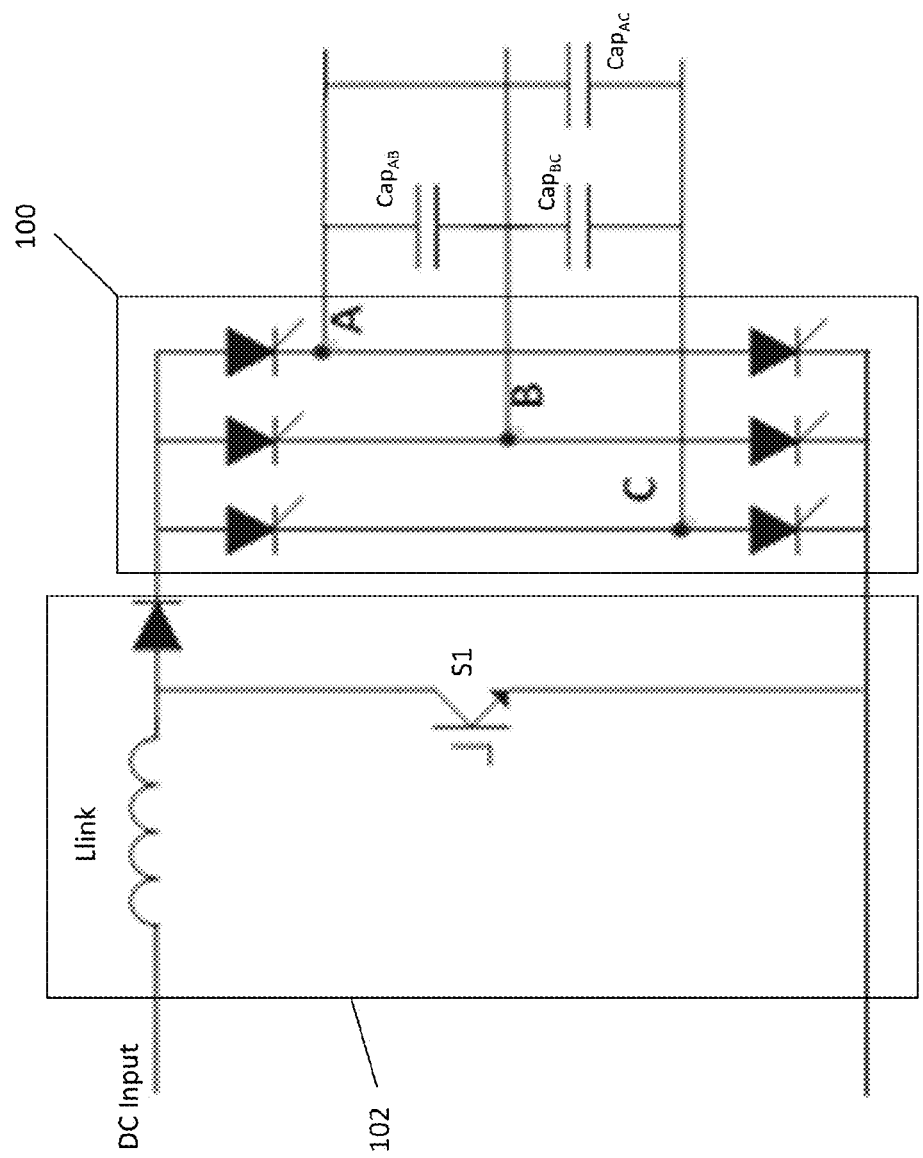
FIG. 9A illustrates a schematic diagram of an embodiment of an AC link power converter having a boost stage as the AC link.
Figure 9B:
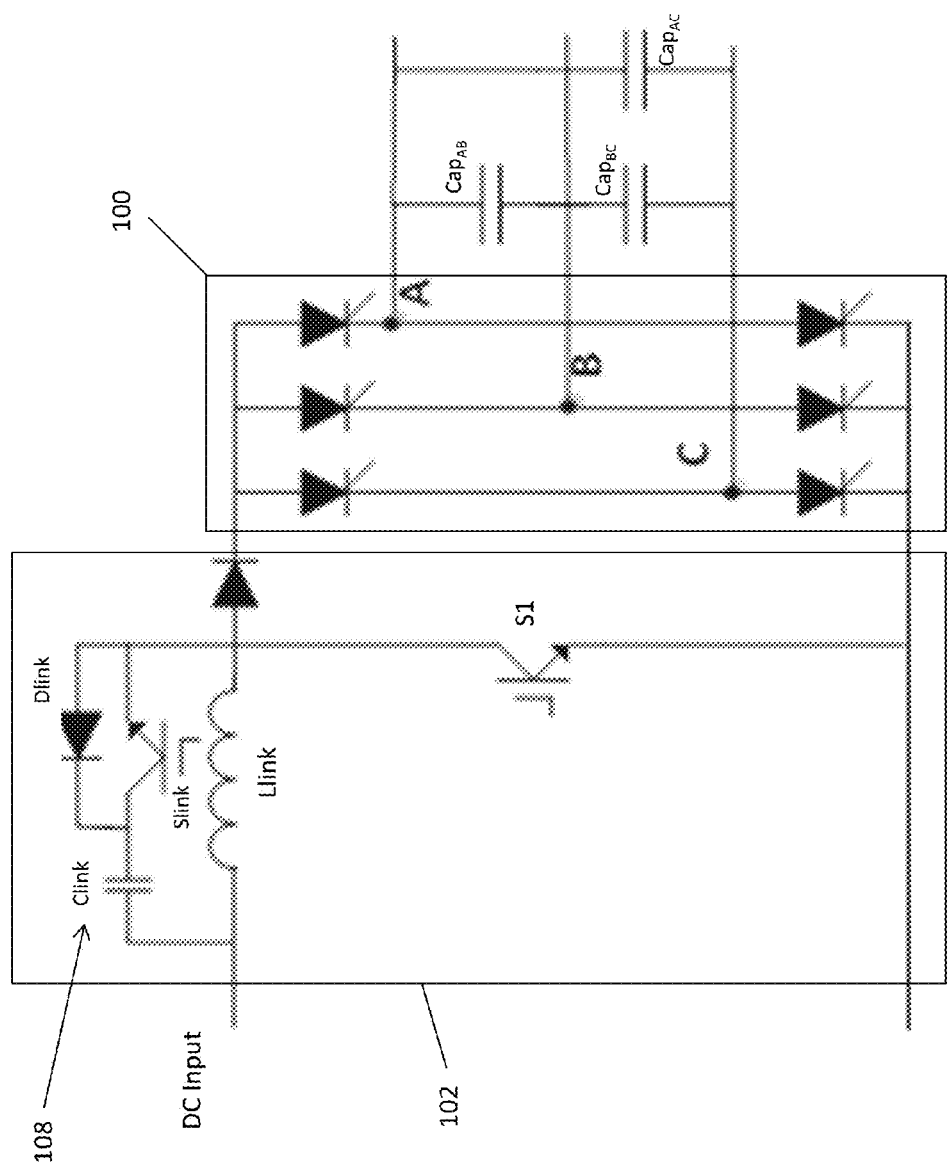
FIG. 9B illustrates a schematic diagram of an embodiment of the AC link power converter of FIG. 9A, in which the active AC link further includes an active clamping circuit coupled in parallel with the link inductor.

FIG. 9A illustrates another embodiment of the active AC link power converter, implemented with a boost stage. FIG. 9B shows the boost power converter of FIG. 9A, modified so that the active AC link 102 includes the active clamping circuit 108 coupled in parallel with the link inductor Llink as previously described herein. The boost topology allows for a step up of the power converter output voltage, and is useful when the input voltage of the power converter is relatively low compared to the desired output voltage.

Figure 10:
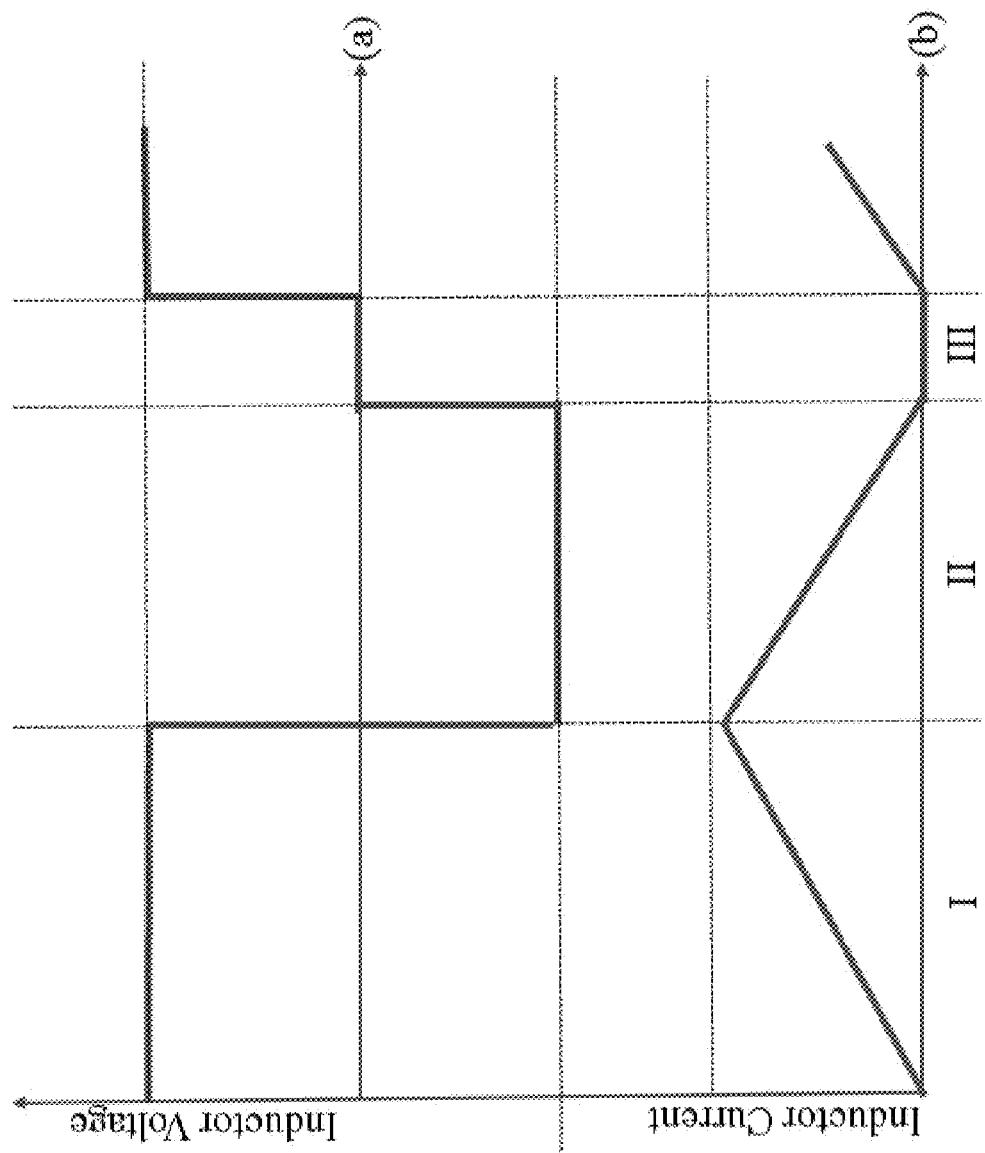
FIG. 10 illustrates the voltage and current waveforms of the boost power converter of FIG. 9A during operation.
Figure 11A:
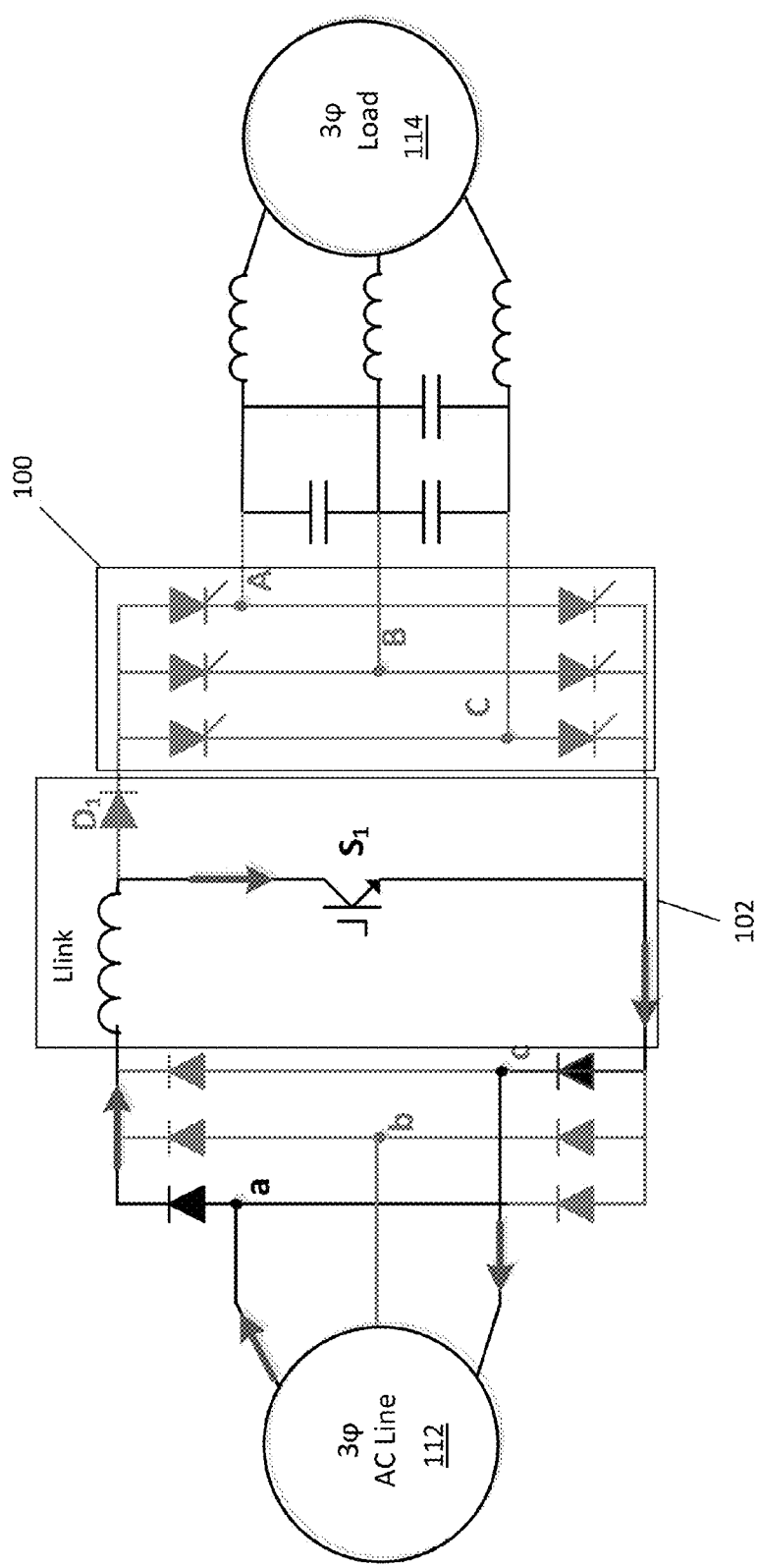
FIGS. 11A through 11C illustrate the different modes of operation for the power converter.
Figure 11B:
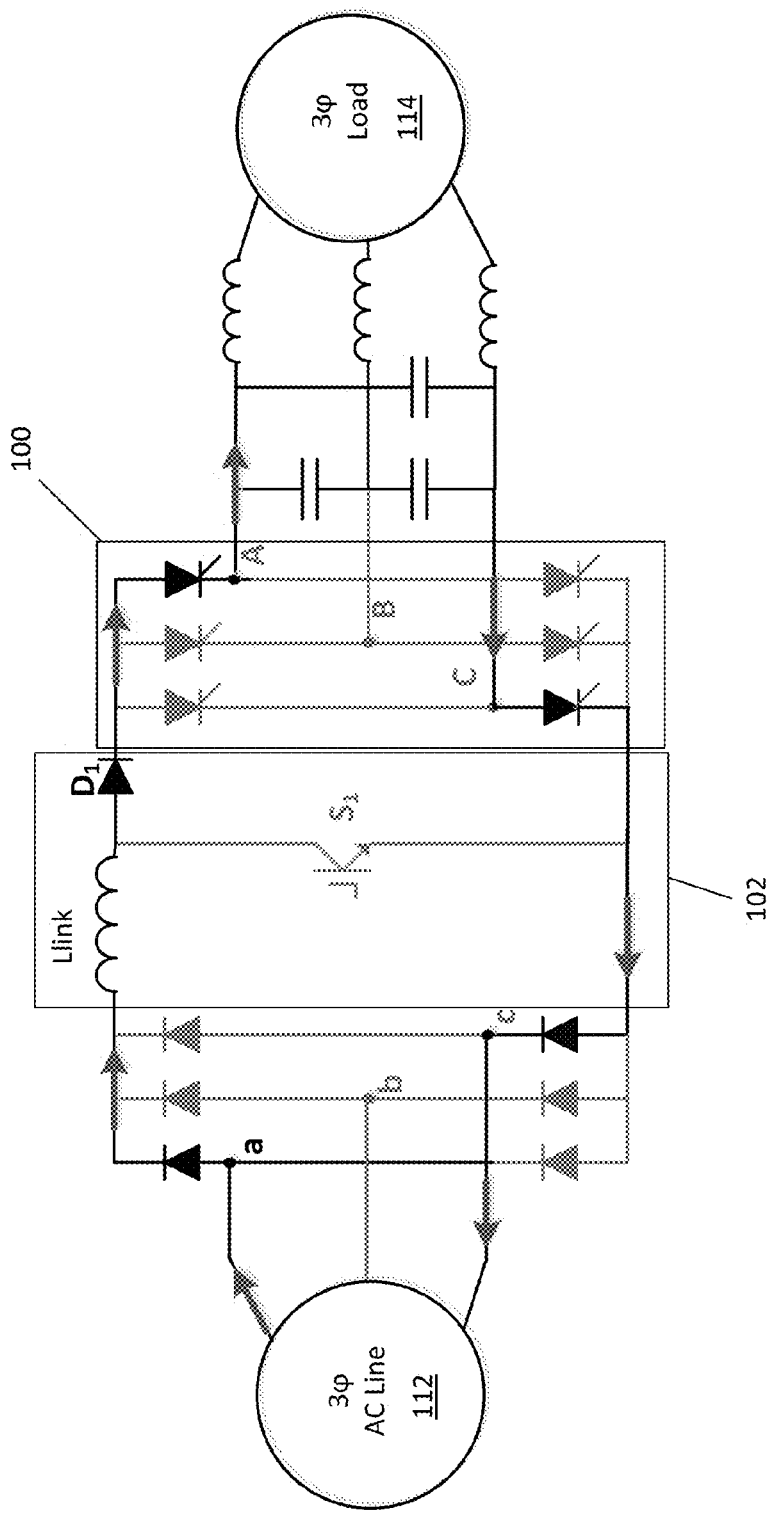
Figure 11C:
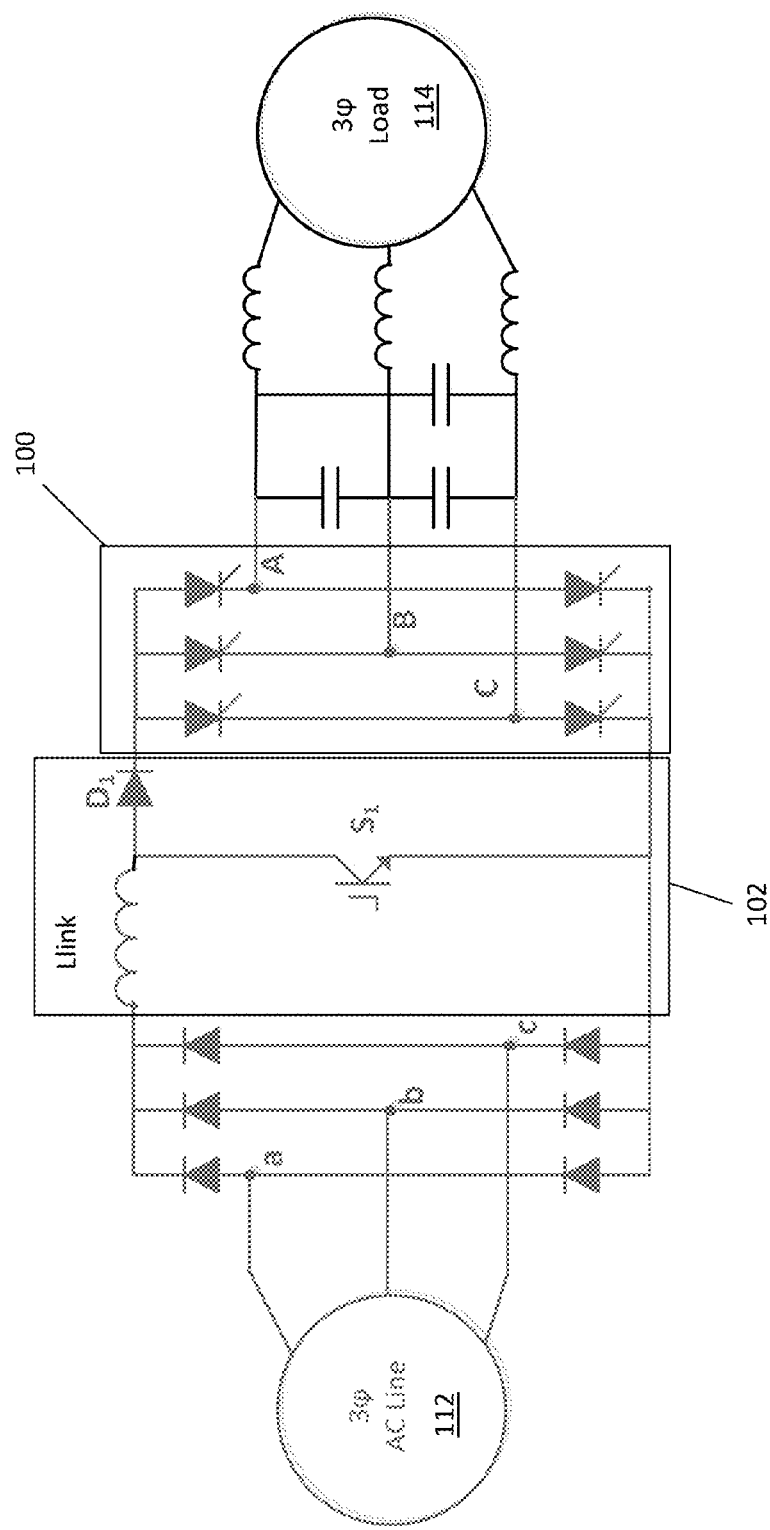

Operation of the boost power converter shown in FIG. 9A is described next in further detail in connection with FIG. 10 and FIGS. 11A through 11C. FIG. 10 shows the voltage and current waveforms of the boost power converter during operation, and FIGS. 11A through 11C show the different modes of operation for the power converter in which the power converter operates as a 3-phase motor drive as an illustrative example. In FIGS. 11A through 11C, the current paths in the different modes are highlighted with arrows. The modes of operation associated with the active clamping circuit 108 i.e. Modes V and VI previously described in connection with FIGS. 5E and 5F are identical for the boost power converter shown in FIG. 9B with the active clamping circuit 108, and therefore are not repeated here. The power converter controller 106 is not shown in FIGS. 8A through 8D for ease of illustration, but controls the gate voltages of all the power converter switching devices to enable the different modes of operation.

Mode I (FIG. 11A) starts when main switch S1 of the power converter turns on and the link inductor Llink is directly connected to the input of the power converter. As a result, the link inductor Llink is being charged and $i_L$ is linearly increasing. Mode I ends when main switch S1 turns off.

Mode II (FIG. 11B) starts when main switch S1 of the converter is already off and diode D1 turns on to carry on the inductor current. The energy stored in the link inductor Llink is being discharged, and the inductor current is linearly increasing. Mode II ends when all energy stored in the link inductor Llink is discharged to the load 114 and the inductor current reaches zero. At the end of Mode III, all switching components of the output converter 100 turn off under the zero-current switching conditions as previously described herein.

Mode III (FIG. 11C) is an idle mode which starts when the inductor current reaches zero, and therefore all switching components of the converter are off in this mode. The output capacitors $Cap_{AB}$, $Cap_{BC}$, $Cap_{AC}$ are solely supplying the load 114 during Mode III. At the end of Mode III, main switch S1 can be turned on to initiate another switching cycle.

The controller 106 of the boost power converter controls main switch S1 and the thyristors of the output converter 100 during operation of the power converter by closing main switch S1 during the first stage of the switching cycle, so as to connect the link inductor Llink to the DC input and charge the link inductor Llink (Mode I), opening main switch S1 and triggering one thyristor device of two phase legs during the second stage of the switching cycle, so as to discharge the link inductor Llink to the load 114 when the triggered thyristors of the output converter 100 are conducting (Mode II), and waiting for the link inductor Llink to fully discharge and for each thyristor of the output converter 100 to turn off automatically before initiating another switching cycle (Mode III).

Figure 12:
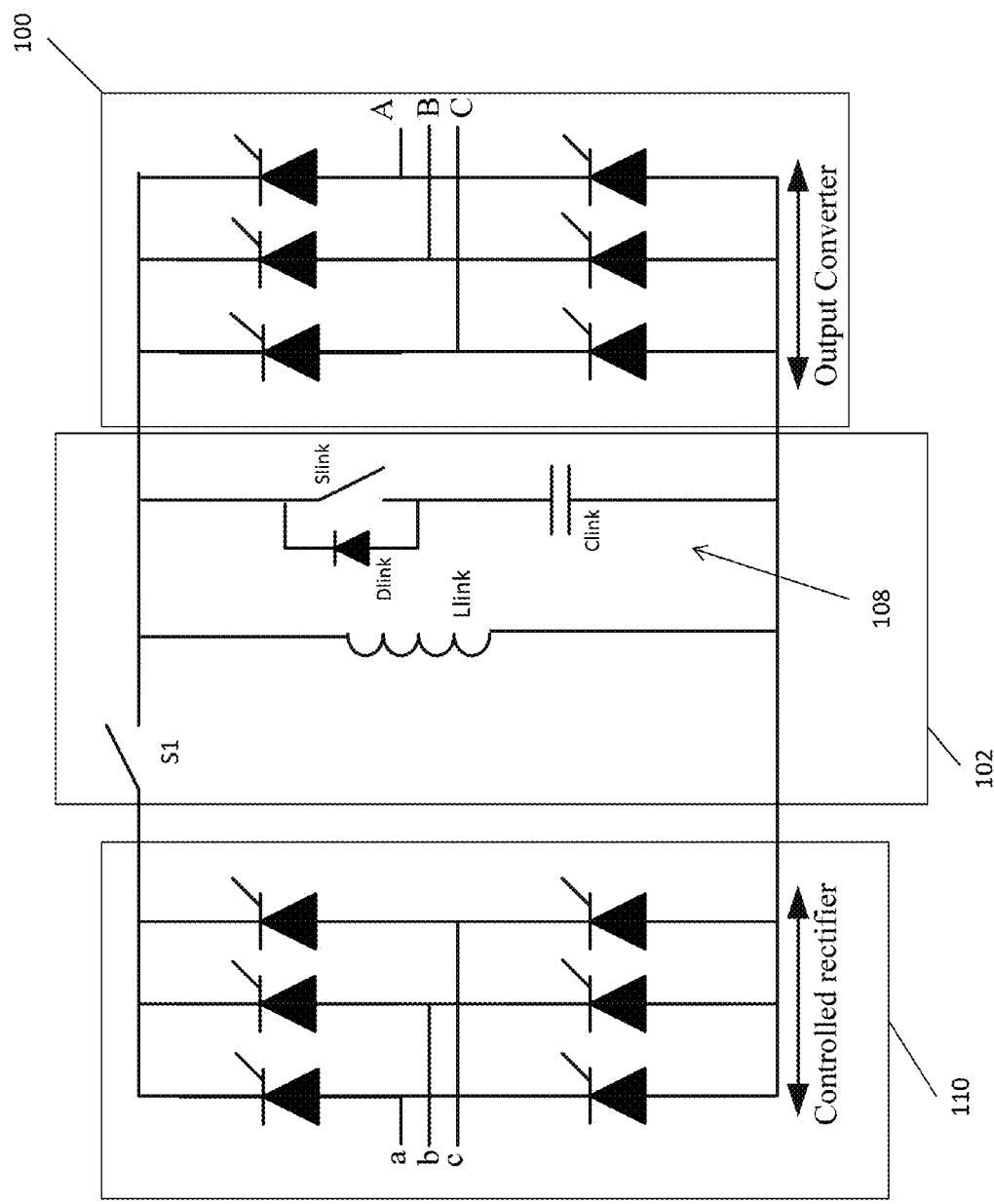
FIG. 12 illustrates yet another embodiment of the power converter, wherein the front-end converter is implemented as a controlled rectifier for controlling the output voltage of the rectifier.

FIG. 12 illustrates yet another embodiment of the active AC link power converter, wherein the front-end converter 110 is implemented as a controlled rectifier for controlling the output voltage of the rectifier. The controlled rectifier has an input phase leg for each input phase (a, b, c in this example), and each input phase leg comprises a first thyristor device connected in series with a second thyristor device between which the corresponding input phases terminate. The controller (not shown for ease of illustration) controls triggering of the respective thyristors of the controlled rectifier, so that the controlled rectifier provides freedom to control the output waveforms of the power converter, which can be beneficial for lowering the output voltage and power levels of the power converter.

The controller of the active AC link power converter also can regulate current in each phase of the 3-phase or higher output by triggering the same thyristor device in one of the phase legs in at least two successive switching cycles and successively triggering one thyristor device in each of the remaining phase legs in the at least two successive switching cycles. For example in the case of a 3-phase output, the output converter comprises three phase legs, one for each of the three phases. The controller triggers the same thyristor device in a first one of the three phase legs in two successive switching cycles, triggers one thyristor device in a second one of the three phase legs in only a first one of the two successive switching cycles, and triggers one thyristor device in a third one of the phase legs in only a second one of the two successive switching cycles.

Each iteration, the controller identifies which phase leg has a current reference signal with the highest absolute magnitude and triggers the same thyristor device for that phase leg in two successive switching cycles. This way, the active AC link power converter is coupled to a load via two lines (phases) each switching cycle, and the controller decides which lines are connected based on the absolute magnitude of the current reference signals. When the next phase has the highest amplitude, this phase is coupled to the load for two consecutive switching cycles (in the 3-phase example) and the other two phases are coupled to the load in succession over the two switching cycles. Such a modulation scheme allows for sufficient current regulation of a 3-phase or higher output even though only two lines (phases) of the converter are coupled to the load each individual switching cycle. Also, each phase of the 3-phase or higher output has a 360° sinusoidal line cycle, and each thyristor of the output converter is allowed to commutate for only 120° of its line cycle. The modulation scheme is described in more detail next.

As previously described herein, DCM operation of the active AC link power converter inherently allows for turning on the switches of the front-end converter and turning off the switches of the output converter under zero current switching conditions. This allows for the use of thyristors as the switching devices of the output converter. However, thyristors have a limited operating frequency and typically require tens of micro-seconds to turn off. As such, the controller can decrease the switching requirement placed on the thyristors of the output converter to ensure efficient operation.

Thyristors are naturally commutated switching devices. As such, their turn-off is imposed by the circuit condition, in contrast to forced commutated switching devices such as IGBTs. The thyristors include in the output converter can turn off after the inductor current reaches zero and the inductor is fully discharged to the load. As a result, the current of the conducting thyristors of the output converter is zero when the inductor is fully discharged. Consequently, the conducting thyristors can turn off under zero-switching conditions.

Figure 13:
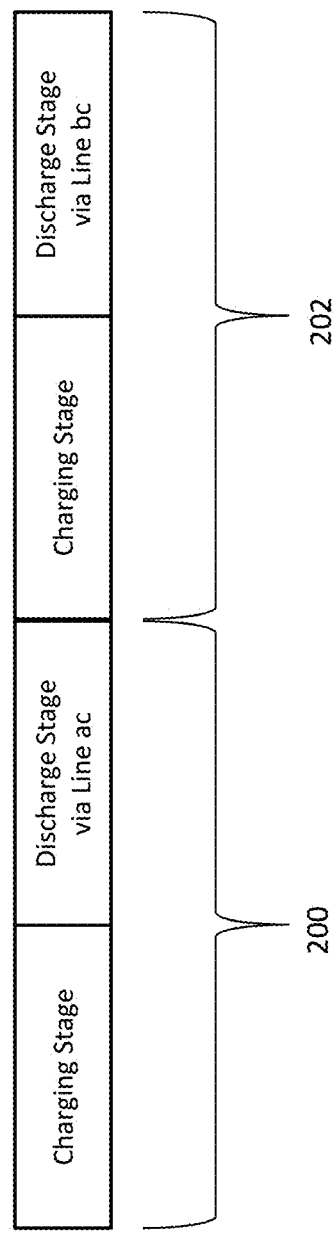
FIG. 13 illustrates a block diagram of two successive switching cycles for the power converter.

As shown in FIG. 13, only a single line of the output converter can be active each switching cycle when thyristors as used as the switching devices of the output converter. The modulation scheme described herein overcomes and addresses this drawback of using thyristors as switching devices of the output converter.

The modulation scheme allows two different lines of the output converter to be active during successive switching cycles despite using thyristors as the switching devices of the output converter. In FIG. 13, line ac (consisting of phases a and c) is active during the first switching cycle 200 and line bc (consisting of phases b and c) is active during the next switching cycle 202. This results in the link inductor being discharged to the load via phases a and c during the first switching cycle 200 and via phases b and c during the next switching cycle 202. The controller minimizes the number of commutations in the output converter, thereby increasing the quality of the output waveforms and reducing the switching requirement of the output converter.

The modulation scheme described herein synthesizes the amount of the energy stored in the link inductor based on the maximum value of current-reference signals for the different phases. With this approach, the average of the link inductor current represents the maximum value of the current-reference signal and only two thyristors of the output converter commutate in each operating sector of the line cycle e.g. 60 Hz.

Figure 14:
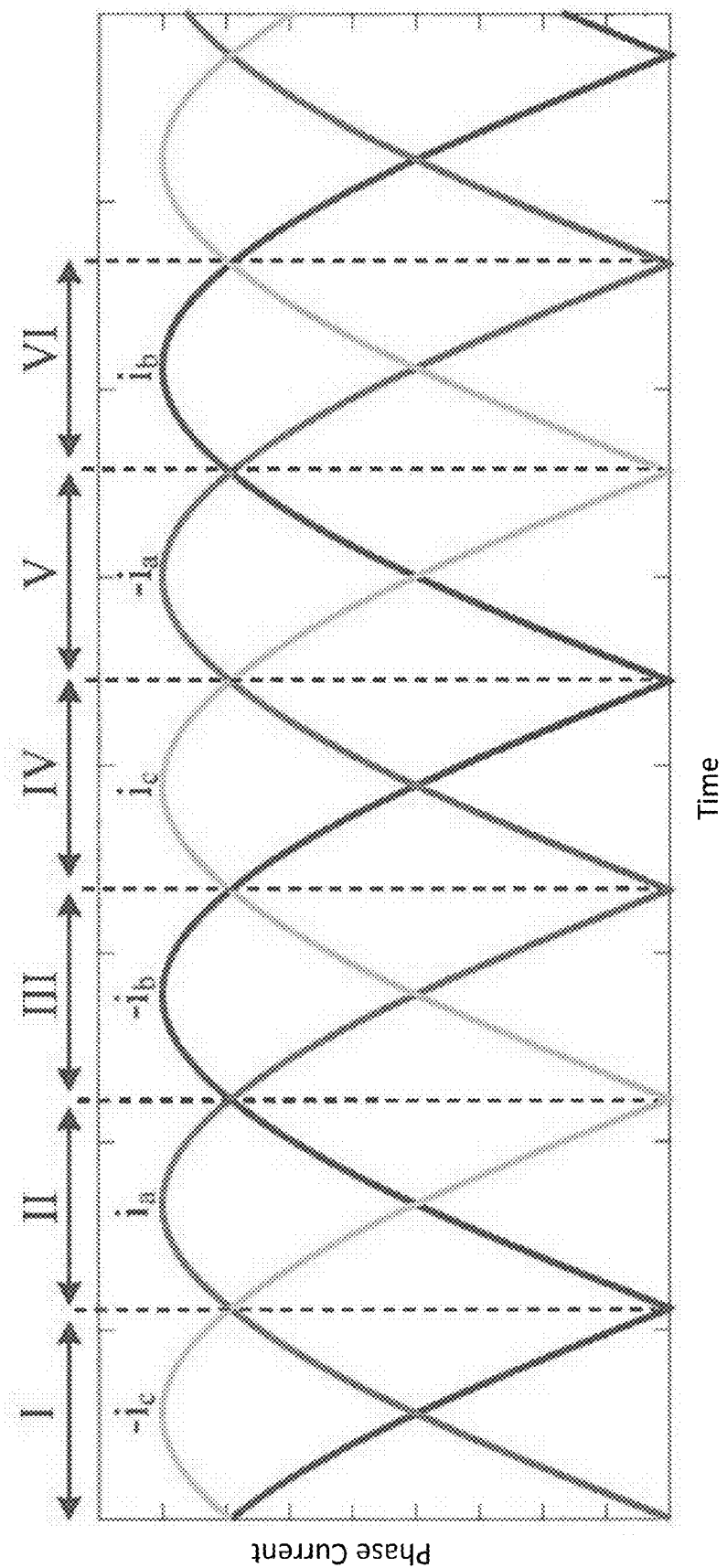
FIG. 14 illustrates current reference signals for three phases of a 3-phase output of the power converter.

FIG. 14 illustrates current reference signals ($i_a$, $i_b$, $i_c$) for three phases (a, b, c) of a 3-phase output of the active AC link power converter. Each line cycle e.g. 60 Hz has six operating sectors (I, II, III, IV, V, V, VI). The absolute value of one of the reference signals is maximum during each sector. The energy stored in the link inductor is synthesized based on the maximum reference signal for each sector. For example, the absolute value of the reference signal ic is maximum in sectors I and IV. Therefore, the average value of the link inductor current represents the absolute value of the reference signal ic when switching in sectors I and IV.

As shown in FIG. 13, each switching cycle comprises one charging stage and one discharging stage as previously described herein. The current of the link inductor reaches zero at the end of each discharging stage to allow the use of thyristors as the switching devices of the output converter.

The energy stored in the link inductor at the end of each charging stage represents a reference signal. These synthesized reference signals are the non-maximum reference signals in each operating sector. For sector I, the first charging stage is synthesized by the reference signal ia, and the second reference signal is synthesized by the reference signal ib. As such, the sum of the amount of energy stored in the link inductor in the charging stages of two successive switching cycles represents the maximum reference signal ic. Many (e.g. 20 to 30 or more) switching cycles occur in each sector, and all current reference signals are synthesized in each switching cycle and are available to the controller. As a result, the controller can decrease the switching requirement of the output converter, and only two thyristors of the output converter need to be commutated in each switching cycle.

Figure 15:
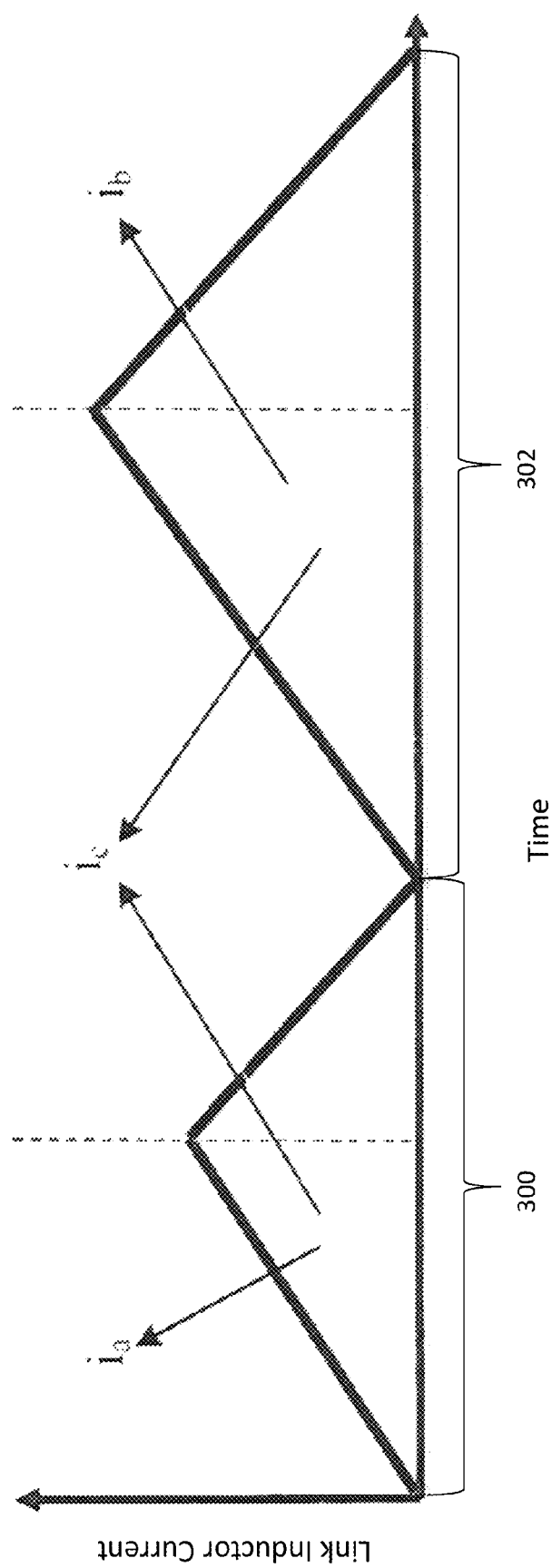
FIG. 15 illustrates synthesized current of the link inductor using a modulation scheme for two successive switching cycles.

FIG. 15 shows the synthesized current of the link inductor using the modulation scheme described herein for two successive switching cycles 300, 302. The output converter operates in sector I of the line cycle in this example. Phase c has the maximum absolute current in sector I. As such, the controller triggers the same thyristor device in the phase leg of the output converter for phase c in two successive switching cycles 300, 302. The controller also successively triggers one thyristor device in each of the remaining phase legs in those two successive switching cycles 300, 302. This way, phase c is active for both switching cycles 300, 302, phase a is active for only one of the switching cycles 300 and phase b is active for the other switching cycle 302. This process is repeated many times per sector (e.g. 20 to 30 times) and for each sector. By doing so, the controller provides 3-phase current regulation via the output converter even though only two phases of the output converter are active during any one switching cycle. Also, the controller can adjust the duty cycle and frequency of the switching cycles to enhance the current regulation, as is standard practice.

Figure 16:
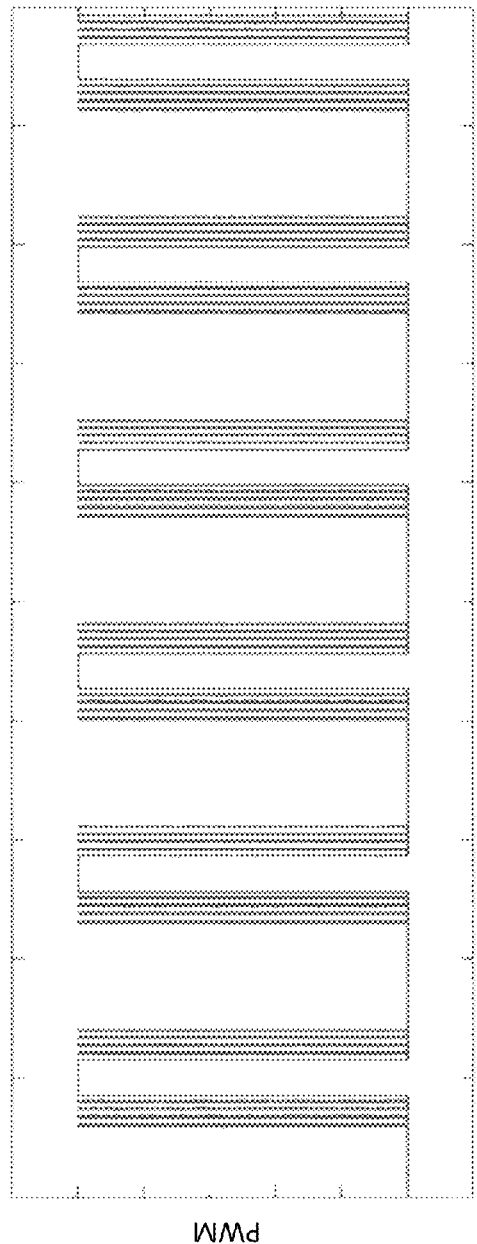
FIG. 16 illustrates the resulting gate signal generated by the power converter controller and applied to the gates of output converter thyristors using the modulation scheme.

FIG. 16 shows the resulting gate signal generated by the controller and applied to the gates of thyristors of the output converter using the modulation scheme described above. In this embodiment, each thyristor does not commutate for 240° of the line cycle e.g. 60 Hz. Instead, the thyristors of the output converter commutate for only 120° of the line cycle. This significantly decreases the switching requirement of the output converter.

Figure 17:
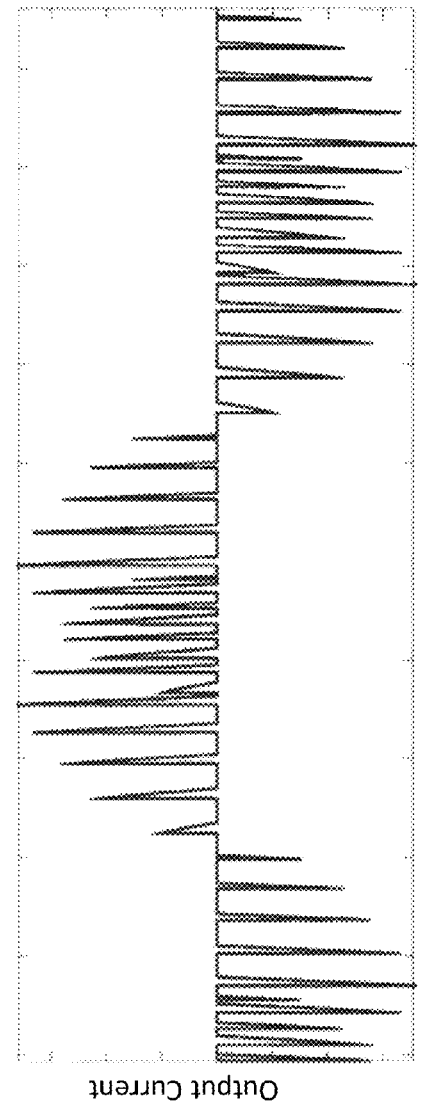
FIG. 17 illustrates the output current of the power converter before output filtering for the gate signal shown in FIG. 16.
Figure 18:
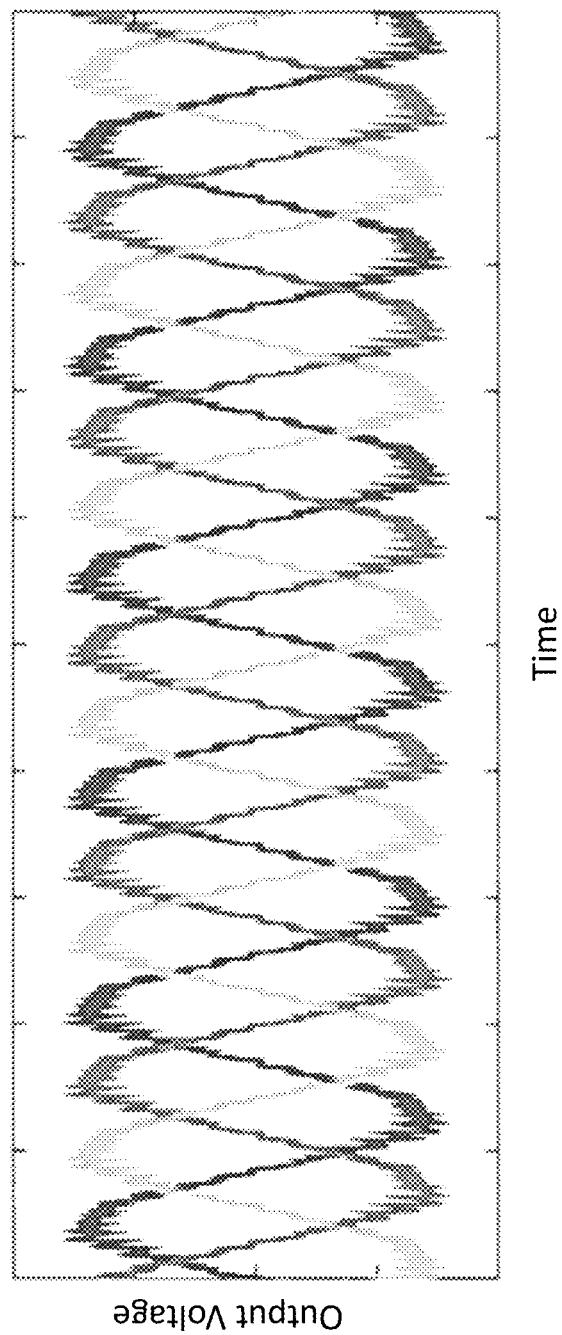
FIG. 18 shows the resulting output voltage waveforms using the modulation scheme.

FIG. 17 shows the output current of the active AC link power converter before output filtering for the gate signal shown in FIG. 16, and FIG. 18 shows the resulting output voltage waveforms using the modulation scheme described above. Consequently, the switching requirement for the switching devices of the output converter is decreased because only two output lines of the converter are fed using the naturally commutated thyristors.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power converter, comprising:
   an output converter having a 3-phase or higher output;
   an inductor coupled to the output converter; and
   a switch device coupled to the inductor,
   an active clamping circuit coupled in parallel with the inductor,
   wherein the switch device is configured to charge the inductor via a DC input during a first stage of a switching cycle of the switch device,
   wherein the output converter is configured to discharge the inductor to a load coupled to the 3-phase or higher output during a second stage of the switching cycle,
   wherein the output converter comprises a phase leg for each phase of the 3-phase, or higher output,
   wherein each phase leg comprises a first thyristor device connected in series with a second thyristor device,
   wherein each phase of the 3-phase or higher output originates between the first thyristor device and the second thyristor device of the corresponding phase leg, and
   wherein the active clamping circuit is configured to freewheel current in the inductor after the first stage of the switching cycle ends and before any of the thyristor devices begin conducting during the second stage of the switching cycle.

2. The power converter of claim 1,
   wherein the active clamping circuit is configured to freewheel current through the inductor in a first direction after the first stage of the switching cycle ends and before any of the thyristor devices begin conducting during the second stage of the switching cycle; and
   wherein the active clamping circuit is configured to freewheel current through the inductor in a second direction opposite the first direction after each thyristor device which was conducting in the second stage of the switching cycle turns off and before another switching cycle begins.

3. The power converter of claim 1,
   wherein the active clamping circuit comprises a capacitor and a switch in series and a diode connected antiparallel with the switch;
   wherein the capacitor and the diode are configured to freewheel current through the inductor in a first direction after the first stage of the switching cycle ends and before any of the thyristor devices begin conducting during the second stage of the switching cycle, so that the capacitor voltage goes from a positive value to a negative value relative to an output voltage of the power converter;
   wherein the capacitor and the switch are configured to freewheel current through the inductor in a second direction opposite the first direction after each thyristor device which was conducting in the second stage of the switching cycle turns off and before another switching cycle begins, so that the capacitor voltage goes positive again relative to the output voltage before another switching cycle begins.

4. The power converter of claim 1, further comprising:
   an input converter having a 3-phase or higher input and configured to convert an AC source coupled to the 3-phase or higher input to the DC input used to charge the inductor.

5. The power converter of claim 1, wherein the power converter includes an inverting buck-boost stage.

6. The power converter of claim 5, further comprising:
   a controller operable to control the switch device and the thyristor devices of the phase legs by:
      closing the switch device during the first stage of the switching cycle, so as to connect the inductor to the DC input and charge the inductor;
      opening the switch device and triggering one thyristor device of two phase legs during the second stage of the switching cycle, so as to discharge the inductor to the load when the one thyristor device of the two phase legs are conducting; and
      waiting for the inductor to fully discharge and for the one thyristor device of the two phase legs to turn off automatically before initiating another switching cycle.

7. The power converter of claim 1, wherein the power converter includes a non inverting buck-boost stage.

8. The power converter of claim 7, further comprising:
   a controller operable to control the switch device and the thyristor devices of the phase legs by:
      closing the switch device during the first stage of the switching cycle, so as to connect the inductor to the DC input and charge the inductor;
      triggering one thyristor device of two phase legs during a first part of the second stage of the switching cycle in which the switch device remains closed, so as to transfer power directly from the DC input to the load via the inductor and the switch device when the one thyristor device of the two phase legs are conducting;
      opening the switch device during a second part the second stage of the switching cycle after the first part, so as to discharge the inductor to the load; and
      waiting for the inductor to fully discharge and for the one thyristor device of the two phase legs to turn off automatically before initiating another switching cycle.

9. The power converter of claim 1, wherein the power converter includes a boost stage.

10. The power convener of claim 9, further comprising:
    a controller operable to control the switch device and the thyristor devices of the phase legs by:
       closing the switch device during the first stage of the switching cycle, so as to connect the inductor to the DC input and charge the inductor;
       opening the switch device and triggering one thyristor device of two phase legs during the second stage of the switching cycle, so as to discharge the inductor to the load, when the one thyristor device of the two phase legs are conducting; and waiting for the inductor to fully discharge and for the one thyristor device of the two phase legs to turn off automatically before initiating another switching cycle.

11. The power converter of claim 1, further comprising:
a controller operable to regulate current in each phase of the 3-phase or higher output by triggering the same thyristor device in one of the phase legs in at least two successive switching cycles and successively triggering one thyristor device in each of the remaining phase legs in the at least two successive switching cycles.

12. The power converter of claim 11,
wherein the 3-phase or higher output has three phases;
wherein the output converter comprises three phase legs, one for each of the three phases; and
wherein the controller is operable to trigger the same thyristor device in a first one of the three phase legs in two successive switching cycles, trigger one thyristor device in a second one of the three phase legs in only a first one of the two successive switching cycles, and trigger one thyristor device in a third one of the phase legs in only a second, one of the two successive switching cycles.

13. The power converter of claim 11, wherein the controller is operable to identify which phase leg has a current reference signal with the highest absolute magnitude and trigger the same thyristor device for that phase leg in the at least two successive switching cycles.

14. The power converter of claim 1, wherein each phase of the 3-phase or higher output has a 360° sinusoidal line cycle, and wherein each thyristor device is allowed to commutate for only 120° of its line cycle.

15. The power converter of claim 1, wherein each thyristor device is in a non-conducting state at the beginning of each switching cycle.

16. A method of converting DC power to AC power using a power converter that includes an output converter having a 3-phase or higher output, an inductor coupled to the output converter, and a switch device coupled to the inductor, and an active clamping circuit coupled in parallel with the inductor, the method comprising;
controlling the switch device so as to charge the inductor via a DC input during a first stage of a switching cycle of the switch device;
discharging the inductor to a load coupled to the 3-phase or higher output via the output converter during a second stage of the switching cycle, the output converter comprising a phase leg for each phase of the 3-phase or higher output, each phase leg comprising a first thyristor device connected in series with a second thyristor device, each phase of the 3-phase or higher output originating between the first thyristor device and the second thyristor device of the corresponding phase leg;
ensuring the inductor is fully discharged to the load before beginning another switching cycle; and
freewheeling current in the inductor after the first stage of the switching cycle ends and before any of the thyristor devices begin conducting during the second stage of the switching cycle.

17. The method of claim 16, wherein the active clamping circuit comprises a capacitor and a switch in series and a diode in anti-parallel with the switch, and wherein current in the inductor comprises:
circulating current through the inductor in a first direction via the capacitor and the diode after the first stage of the switching cycle ends and before any of the thyristor devices begin conducting during the second stage of the switching cycle, so that the capacitor voltage goes from a positive value to a negative value relative to an output voltage of the power converter;
circulating current through the inductor in a second direction opposite the first direction via the capacitor and the switch after each thyristor device which was conducting in the second stage of the switching cycle turns off and before another switching cycle begins, so that the capacitor voltage goes positive again relative to the output voltage before another switching cycle begins.

18. The method of claim 16, further comprising:
regulating current in each phase of the 3-phase or higher output by triggering the same thyristor device in one of the phase legs in at least two successive switching cycles and successively triggering one thyristor device in each of the remaining phase legs in the at least two successive switching cycles.

19. The method of claim 18, wherein the 3-phase or higher output has three phases, wherein the output converter comprises three phase legs, one for each of the three phases, and wherein regulating the current in each phase comprises:
triggering the same thyristor device in a first one of the three phase leas in two successive switching cycles;
triggering one thyristor device in a second one of the three phase legs in only a first one of the two successive switching cycles; and
triggering one thyristor device in a third one of the phase legs in only a second one of the two successive switching cycles.

20. The method of claim 18, further comprising:
identifying which phase leg has a current reference signal with the highest absolute magnitude and triggering the same thyristor device for that phase leg in the at least two successive switching cycles.

* * * * *